United States Patent [19]

Tsuboi et al.

[11] Patent Number: 5,307,473
[45] Date of Patent: Apr. 26, 1994

[54] CONTROLLER FOR STORAGE UNIT AND METHOD OF CONTROLLING STORAGE UNIT

[75] Inventors: Toshiaki Tsuboi, Kawasaki; Akira Yamamoto, Sagamihara; Shigeo Honma, Odawara; Yoshihiro Asaka, Odawara; Koji Ozawa, Hiratsuka; Hiroyuki Kitajima, Yokohama; Michio Miyazaki, Odawara, all of Japan

[73] Assignees: Hitachi, Ltd.; Hitachi Microcomputer System Ltd., both of Tokyo, Japan

[21] Appl. No.: 833,129

[22] Filed: Feb. 10, 1992

[30] Foreign Application Priority Data

Feb. 20, 1991 [JP] Japan .................. 3-025994

[51] Int. Cl.[5] .............................. G06F 13/00
[52] U.S. Cl. ..................................... 395/425
[58] Field of Search .................. 395/400, 425

[56] References Cited

U.S. PATENT DOCUMENTS 4,503,501 3/1985 Coulson et al. ............... 395/425

FOREIGN PATENT DOCUMENTS 59-7986 2/1984 Japan .
62-198946 9/1987 Japan .

Primary Examiner—David L. Robertson
Attorney, Agent, or Firm—Fay, Sharpe, Beall, Fagan, Minnich & McKee

[57] ABSTRACT

In allocating an area of a cache memory to each storage unit, proper allocation of the cache memory is made to each storage unit. If the amount of write-after data becomes equal to or more than a threshold value, an allocation limit is set to each disk unit. If CPU issues a data write request requiring the amount of data equal to or more than the allocation limit, the data write request is held in a wait state until the amount of write-after data becomes less than the allocation limit. Therefore, the allocation amount to the disk unit becomes neither too large nor too small. In this manner, proper allocation of the cache memory to each disk unit can be realized.

10 Claims, 30 Drawing Sheets

DISK UNIT 25

TRACK FORMAT

DATA STRUCTURE OF CONTROL FIELD

FIG. 24

DISPLAY UNIT 37

| ALLOCATABLE SLOT NO. 81 | OVERLOAD SETTING SLOT NO. 82 | OVERLOAD CANCELLATION SLOT NO. 83 |
|---|---|---|
| 1000 | 700 | 600 |

| DISK UNIT NO. 84 | LIMIT SLOT NO. 85 | MINIMUM ALLOCATION SLOT NO. 86 |
|---|---|---|
| 1 | 100 | 10 |
| ⋮ | ⋮ | ⋮ |
| n | 100 | 10 |

| MESSAGE DISPLAY FIELD 87 |
|---|

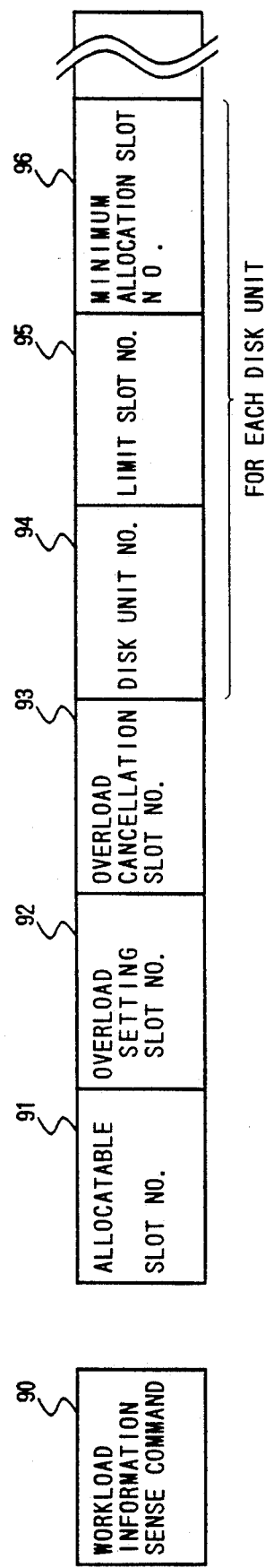
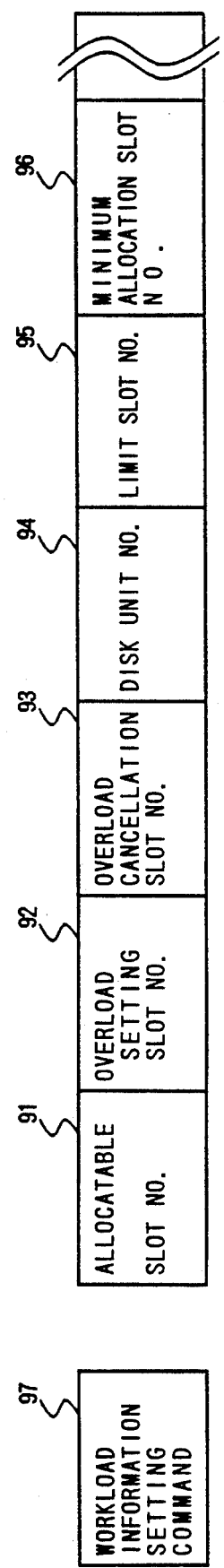

CONTROLLER FOR STORAGE UNIT AND METHOD OF CONTROLLING STORAGE UNIT

BACKGROUND OF THE INVENTION

The present invention relates to a controller for allocating areas of a cache memory in an information processing system having a central processing unit, the controller with the cache memory, and storage units, and to a method of controlling allocation of areas of a cache memory.

In a process of data transfer between a central processing unit and cache memory, updated data in the cache memory is called write-after data. A process of writing the write-after data within the cache memory into a disk unit, is called a write-after process. This write-after process is described, e.g., in JP-B-59-7986 and JP-A-62-198946.

The controller described in JP-B-59-7986 writes write-after data within a cache memory of the controller into a disk unit, by means of a first-in/first-out (FIFO) control or least recently used (LRU) control.

The controller described in JP-A-62-198946 responds to a write request from a central processing unit (CPU), and transfers data from CPU to the cache memory if the cache has write-after data less than a predetermined amount. If the cache memory has write-after data more than the predetermined amount, data is transferred from CPU to a disk unit, and thereafter, the write-after data in the cache memory is written>into a disk unit.

Upon reception of a read request from CPU, if the request data is not present in the cache memory and if the data to be deleted from the cache in order to store the requested data in the cache is write-after data, then the write-after data is written into a disk unit, and thereafter the requested data is read from a disk unit to transfer it to CPU and also store it in the cache memory.

Upon reception of a write request from CPU, the controller transfers data from CPU to the cache memory to store write-after data in the cache. The controller writes the write-after data in the cache memory asynchronously with the write request.

A disk unit has a plurality of disks as recording media, and data read/write heads provided for respective data recording surfaces of the disks. A circular data recording unit relative to which the head can read/write data while the disk rotates once, is called a track. A plurality of tracks are formed on the disk surface. An operation of moving the head to a track position where the head can read/write data, is called a seek operation. In the write-after control, in response to a write request from CPU, data is transferred from CPU to the cache memory. Therefore, it does not take time for the seek operation, allowing high speed response.

The contents of data except write-after data in the cache memory, i.e., data already written in a disk unit, are the same as the data in the disk unit. Therefore, such data can be deleted from the cache memory at any time. However, the contents of write-after data within the cache memory are not the same as the corresponding data in a disk unit, so that such data cannot be deleted from the cache unless it has been written in a disk unit.

If write-after data completely fills the cache memory, new write-after data cannot be generated unless the write-after data within the cache has been written in a disk unit. Writing write-after data within the cache into a disk unit necessarily requires time for the seek operation, being unable to expect high speed response in the write-after control.

The contents and occurrence frequency of a request to be issued to a disk unit are not constant, but depend on the data stored in the disk unit. For example, assuming that a request is issued to a certain disk unit at a high occurrence frequency to generate a great amount of write-after data, the amount of write-after data which other disk units can generate is considerably limited since there is only one cache memory. In such a case, an apparent disk performance as viewed from CPU is such that the performance of the disk unit which generated a great number of write-after data is superior to other disk units. A disk unit actually requiring high speed response is not allowed to generate a great amount of write-after data, but a disk unit which occupied the cache memory faster can generate a great amount of write-after data.

It is therefore important to distributively allocate a proper fraction of capacity of the cache memory to each disk unit. If write-after data fills the cache memory, all disk units are inhibited to undergo a write-after process, degrading the performance of the whole system. Such a case can be avoided by distributively allocating a proper fraction of capacity of the cache memory to each disk unit.

However, the above-cited related art JP-B-597986 does not consider proper allocation of capacity of the cache memory to each disk unit. Although the other related art JP-A-62-198946 can effectively limit the total amount of write-after data in the cache memory, it does not consider proper allocation of capacity of the cache memory to each disk unit.

SUMMARY OF THE INVENTION

It is an object of the present invention to provide a controller for distributively allocating a proper fraction of capacity of a cache memory to each storage unit.

The controller comprises: a cache memory for storing part of data in a storage unit or data before being stored in a storage unit; a directory for recording management information of the controller; and a director for controlling the cache memory and directory, and controlling data transfer between CPU and the cache memory or storage unit, and between the cache memory and storage unit. The director may comprise: means for judging whether the amount of data in the cache memory before being stored in a storage unit is equal to or greater than a first threshold value, or less than a second threshold value; means for setting an allocation limit value of data for each storage unit if the amount of data in the cache memory is equal to or greater than the first threshold value; means for canceling the allocation limit value of data for each storage unit if the amount of data in the cache memory is less than the second threshold value; means for setting a wait state relative to a data write request from CPU requiring a cache memory allocation equal to or greater than the allocation limit value; and means for writing the data within the cache memory before being stored in a storage unit, into the storage unit.

The means for writing the data in the cache memory before being stored in a storage unit, into the storage unit, may comprise: means for selecting data corresponding to one storage unit among a group of storage units which are set with the wait state by the means for setting a wait state relative to a data write request from CPU requiring a cache memory allocation equal to or greater than the allocation limit value, and writing the selected data within the cache memory into a storage unit; and means for selecting data corresponding to one storage unit among a group of storage units which are set with the allocation limit value, and writing the selected data within the cache memory into a storage unit.

The director may further comprise: sequential write-after judgment means for judging whether write-after data generated upon a sequential access instruction from CPU exists a predetermined amount or more; and means for executing a sequential write-after data process for writing the write-after data within the cache memory into a storage unit, if there is write-after data subjected to the sequential write-after process.

The director may comprises: means for informing the threshold value of the amount of data within the cache memory before being stored in a storage unit memory, and the allocation limit value of data for each storage unit, respectively to CPU; and means for setting the threshold value of the amount of data within the cache memory before being stored in a storage unit, and the allocation limit value of data for each storage unit, respectively designated from CPU.

The controller comprises: the cache memory for storing part of data in a storage unit or data before being stored in a storage unit; the directory for recording management information of the controller; and the director for controlling the cache memory and directory, and controlling data transfer between CPU and the cache memory or storage unit. In the controller, the means for judging whether the amount of data in the cache memory before being stored in a storage unit is equal to or greater than the threshold value, can control to write data into the cache memory. If the amount of data in the cache memory is equal to or greater than the threshold value, the means for setting an allocation limit value of data for each storage unit, can establish a storage area of data for each storage unit.

If the amount of data in the cache memory is less than the threshold value, the means for canceling the allocation limit value of data for each storage unit, can reduce the number of processes required for judgment of the data amount.

The means for setting a wait state relative to a data write request from CPU requiring a cache memory allocation equal to or greater than the allocation limit value, can prevent an increase of data to be stored in a the storage unit.

The means for writing the data in the cache memory before being stored in a storage unit, into the storage unit, can reduce the amount of data. In this case, the means for selecting data corresponding to one storage unit among a group of storage units which are set with the wait state by the means for setting a wait state relative to a data write request from CPU requiring a cache memory allocation equal to or greater than the allocation limit value, and writing the selected data within the cache memory into a storage unit, can preferentially write the data which is set with the wait state caused by the allocation limit value of data.

The means for selecting data corresponding to one storage unit among a group of storage units which are set with the allocation limit value, and writing the selected data within the cache memory into a storage unit, can prevent the wait state caused by the allocation limit value of data, from being left alone.

Accordingly, it is possible to provide a controller allowing proper allocation of the cache memory to each storage unit.

The sequential write-after judgment means for judging whether write-after data generated upon a sequential access instruction from CPU exists a predetermined amount or more, allows CPU to consecutively generate write-after data. If write-after data is consecutively generated, write-after data to be written into the storage unit rapidly increases. In this connection, the means for executing a sequential write-after data process for writing the write-after data within the cache memory into a storage unit, can write the write-after data consecutively generated by CPU, into a storage unit.

Accordingly, it is possible to provide a controller allowing proper allocation of the cache memory to each storage unit, even if a sequential access instruction is issued from CPU.

The means for informing the threshold value of the amount of data within the cache memory before being stored in a storage unit memory, and the allocation limit value of data for each storage unit, respectively to CPU, allows CPU to check the overload state of a storage unit. The means for setting the threshold value of the amount of data within the cache memory before being stored in a storage unit memory, and the allocation limit value of data for each storage unit, respectively designated from CPU, allows to set the threshold value and the allocation limit value, in accordance with a response time of the storage unit requested by CPU. Accordingly, it is possible to provide a controller allowing proper allocation of the cache memory to each storage unit, while considering a request from CPU.

BRIEF DESCRIPTION OF THE DRAWINGS

FIG. 24 is a diagram showing an example of a display on a service panel.

FIGS. 29A and 29B show the contents of information to be transferred between CPU and the controller.

DESCRIPTION OF THE PREFERRED EMBODIMENTS

Embodiments of the present invention will be described hereinafter.

Figure 2:
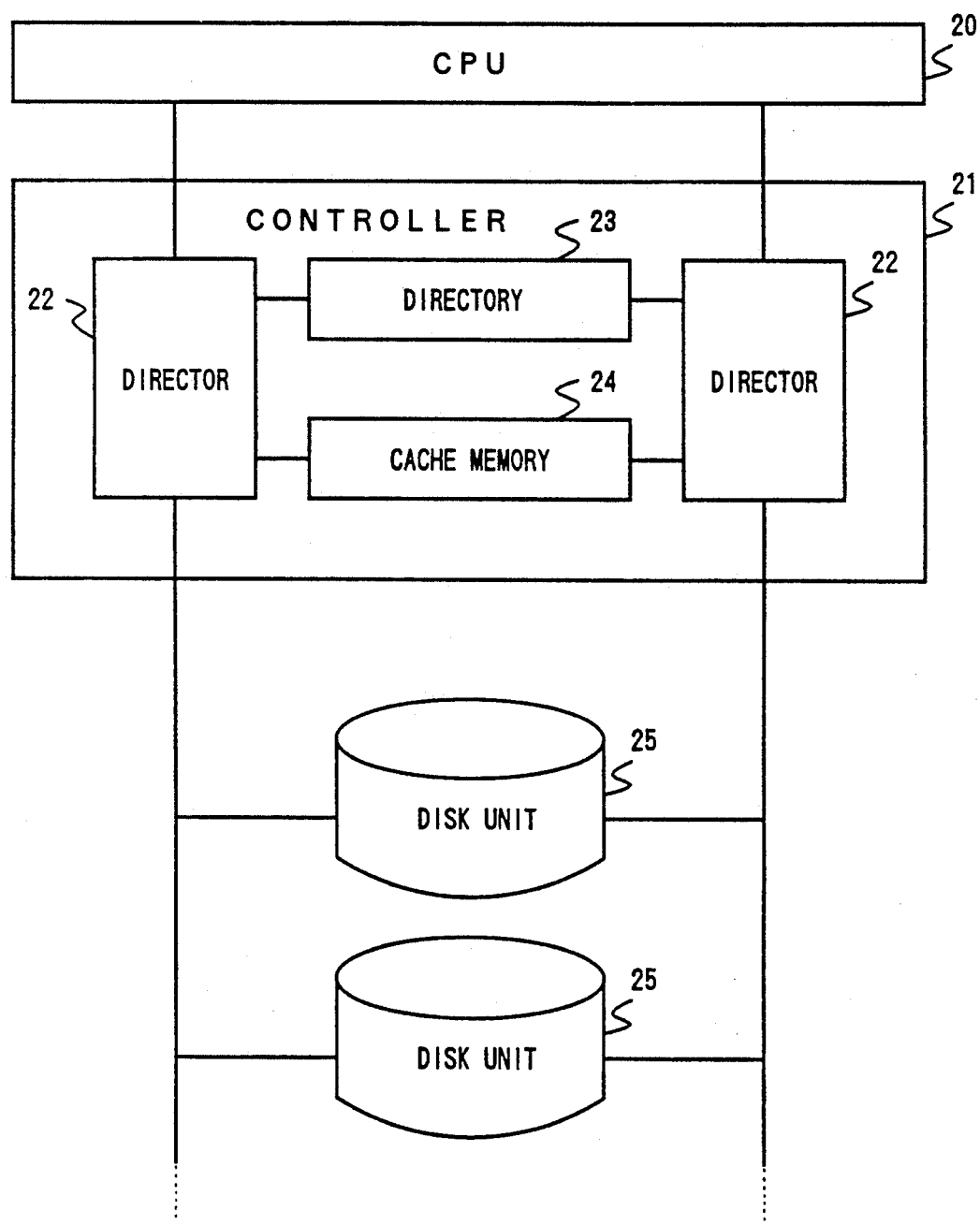
FIG. 2 is a schematic diagram briefly showing the structure of the information processing system according to the of the present invention.

FIG. 2 shows the configuration of an information processing system according to a first embodiment of the present invention. The information processing system includes a central processing unit (CPU) 20, a controller 21 connected to CPU 20, and a plurality of disk units 25 connected to the controller 21. The controller 21 has a directory 23, a cache memory 24, and at least one director 22.

Figure 3:
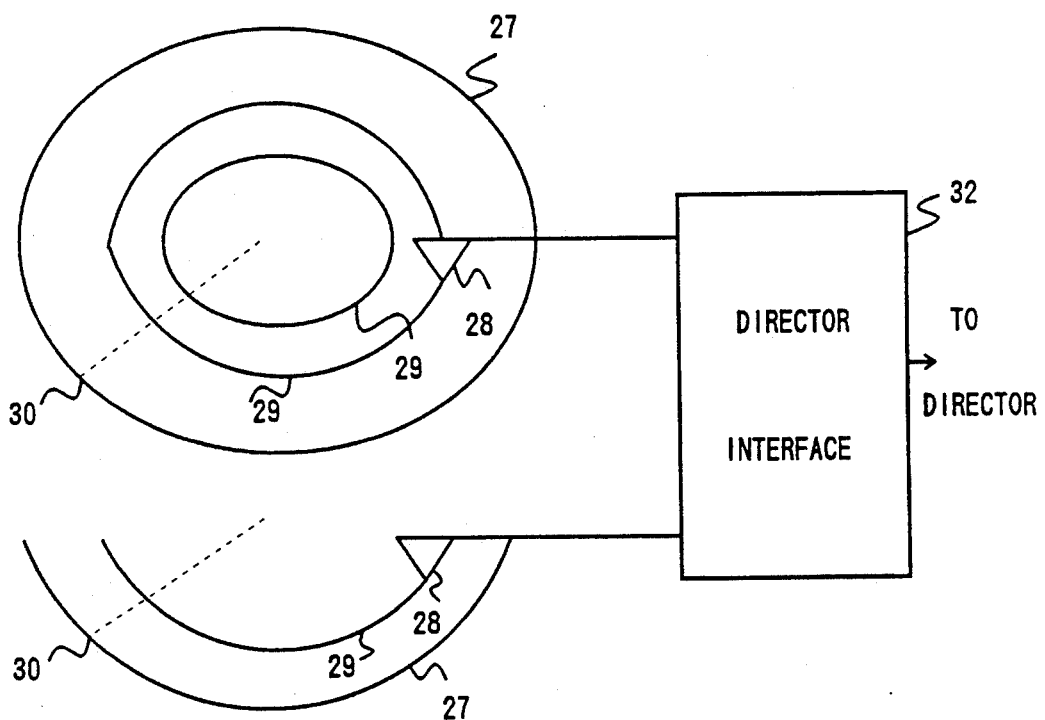
FIG. 3 shows the structure of a disk unit.

FIG. 3 shows the structure of a disk unit 25. A disk 27 is a data recording medium. Each disk unit 25 has a plurality of disks. A head 28 reads/writes data, and is provided at each data recording surface. A circular data recording unit relative to which the head 28 can read/write data while the disk 27 rotates once, is called a track. A plurality of tracks 29 are formed on the disk 27 surface. Records which are a kind of data recording units are stored in the track 29. An operation of moving the head 28 from the present position to a position of track 29 where the head can read/write data, is called a seek operation. A request for such an operation is called a positioning request. A set of tracks which can be written/read only by selecting heads 28 without a seek operation, is called a cylinder. A director interface 32 interfaces between the disk unit 25 and the director, and controls the head 28 in response to an instruction from the director 22. An index 30 indicates a reference position on the disk 27.

Figure 4A:
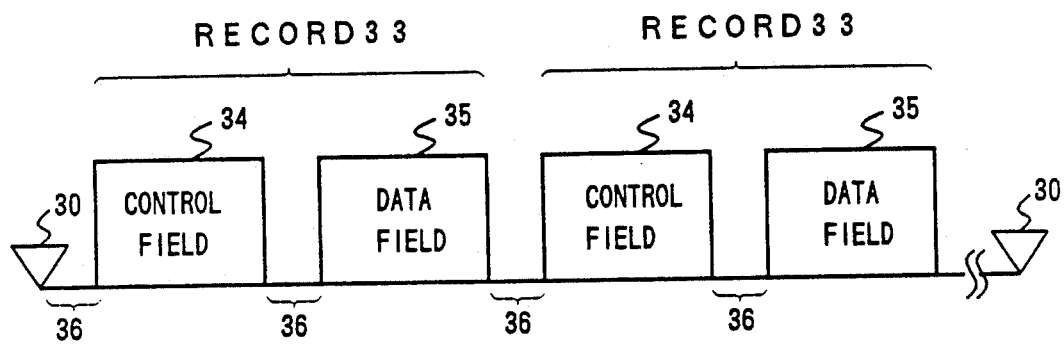
FIGS. 4A and 4B show the formats of records in a track according to the embodiment.
Figure 4B:
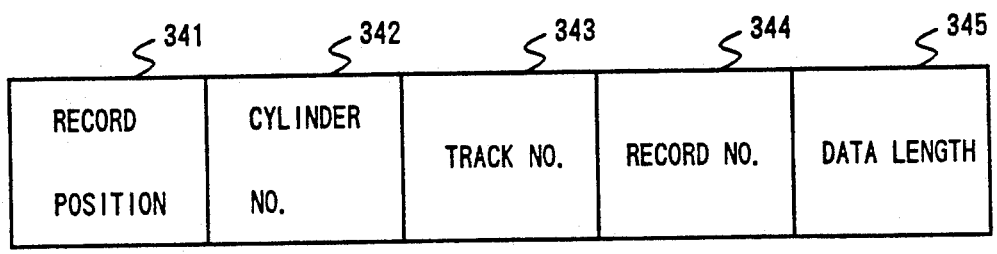

FIGS. 4A and 4B show the formats of records within a track according to the present embodiment. As shown in FIG. 4A, a record 33 has a control field 34 records therein a record position 341, a cylinder number 342, a track number 343, a record number 344, and a data length 345. The record position 341 indicates the position of the record 33 on the track 29. The record number 344, track number 343 and cylinder number 342 are the number of the record 33, the number of the track having the record 33, and the number of the cylinder having the track 29, respectively. The data length 345 indicates the length of the data field 35. The data field 35 records data having the length indicated by the data length 345. Gaps 36 are present between the index 30 and control field 34, between the control field 34 and data field 35 of each record, and between the data field 35 of each record and the control field 34 of the next record 33.

Figure 1:
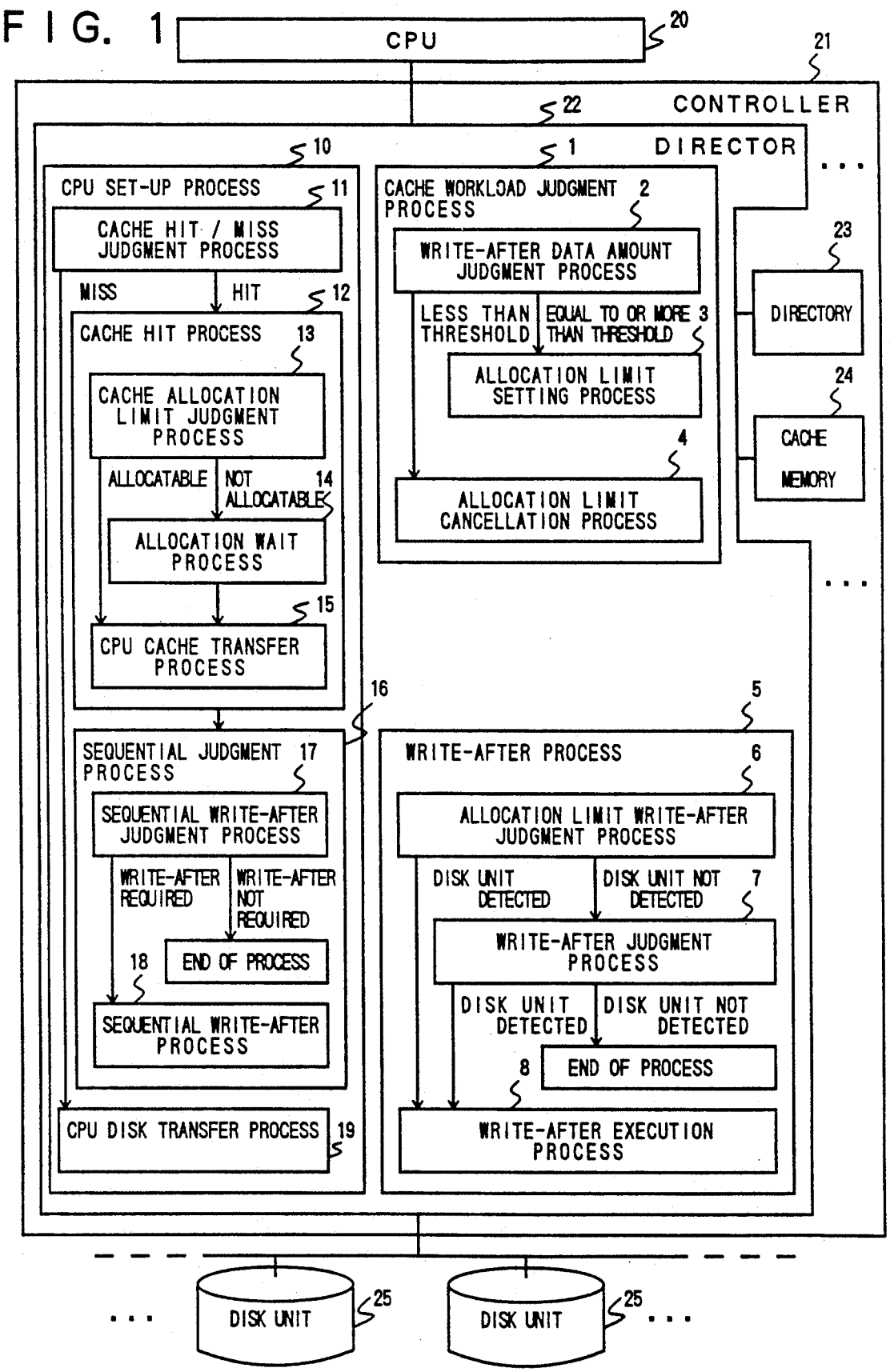
FIG. 1 shows the configuration of an information processing system according to an embodiment of the present invention.

FIG. 1 shows the configuration of the information processing system according to the embodiment of the present invention. The director 22 of the controller 21 controls data transfer between CPU 20 and a disk unit 25, between CPU 20 and the cache memory 24, and between the cache memory 24 and a disk unit 25. A CPU set-up process 10 transfers data between CPU 20 and a disk unit 25 and between CPU 20 and the cache memory 24, in response to an instruction from CPU 20. A hit/miss judgment process 11 judges if the contents of a track 29 to be processed exist in the cache memory 24. If the contents of the track 29 exist in the cache memory 24, it is called a cache hit, and if not, it is called a cache miss.

In the case of a cache hit, a cache hit process 12 is executed. In the cache hit process 12, a cache allocation limit judgment process 13 judges an allocation state of the cache memory 24 with respect to write-after data. If allocation is not possible, an allocation wait process 14 waits until allocation of the cache memory is allowed. A CPU cache transfer process 15 reads/writes data from/into the cache memory 24 in response to an instruction from CPU 20. Next, a sequential judgment process 16 is executed. In the sequential judgment process 16, a sequential write-after judgment process 17 responds to a sequential access instruction from CPU 20 to judge if the write-after process is required because write-after data fills the cache memory 24. If the write-after process is not required, the flow is terminated. If required, in response to the sequential access request from CPU 20, a sequential write-after process is executed to write write-after data within the cache memory 24 into a disk unit 25.

In the case of a cache miss, a CPU disk transfer process 19 reads/writes data from/into a disk unit 25 in response to an instruction from CPU 20.

A cache workload judgment process 1 judges a workload state of the cache memory 24 in accordance with the amount of write-after data in the cache memory 24. A write-after data amount judgment process 2 judges if the amount of write-after data is a threshold value or more. If threshold value or more, an allocation limit setting process 3 sets a limit value of the amount of write-after data for each disk unit 25. If less than the threshold value, an allocation limit cancellation process 4 cancels the limit values of the write-after data amount set to the disk units 25.

A write-after process 5 writes write-after data within the cache memory 24 into a disk unit 25, this process being carried out by the director 22 using idle time. An allocation limit write-after judgment process 6 judges whether the write-after process is executable relative to a disk unit 25 with the limit value of the write-after data amount being set. If there is no disk unit 25 with the limit value of the write-after data amount being set, a write-after judgment process 7 judges if the write-after process is executable relative to a disk unit 25 with the limit value of the write-after data amount not being set. If a disk unit 25 subject to the write-after process is detected at the allocation limit write-after judgment process 6 or at the write-after judgment process 7, then a write-after execution process 8 writes write-after data within the cache memory into the detected disk unit 25.

Referring to FIGS. 1 and 3, the read/write operation for a record 33 stored in a disk unit 25 will be described.

If a disk unit 25 storing a record 33 relative to which data is read/written is free, the director 22 connects the disk unit 25 and issues a positioning request in order to move the head 28 to a position where data can be read/written relative to the record 33. While the disk unit 25 performs the positioning operation, the director 22 disconnects the disk unit 25 so that an input/output process for another disk unit 25 can be executed. In response to the positioning request, the disk unit 25 performs the seek operation, and returns a completion report back to the director 22 when the head 28 reaches the position where data can be read/written relative to the record 33. In this case, if the director 22 is idle, the director 22 reconnects the disk unit 25 to read/write data relative to the record 33 stored in the disk unit 25. If the director 22 is busy, e.g., during data transfer to and from another disk unit 25, the disk unit 25 cannot transfer data to and from the director 22 so that it waits until the head 28 again reaches a position where data can be read/written relative to the record 33 after the disk 27 further rotates.

Figure 5:
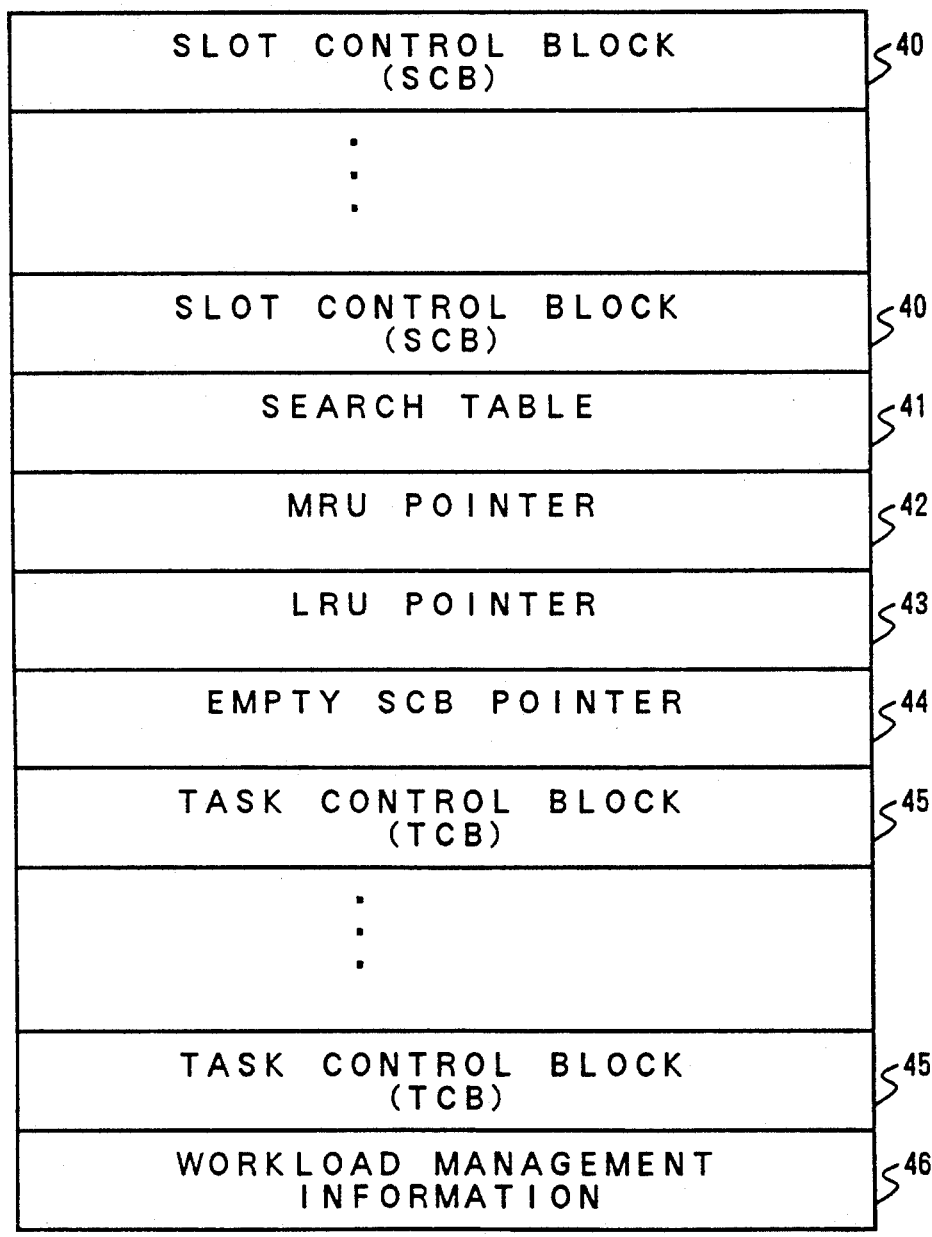
FIG. 5 shows the contents of a directory.

FIG. 5 shows the structure of the directory 23. The directory 23 has slot control blocks (SCBs) 40, a search table 41, a most recently used (MRU) pointer 42, a least recently used (LRU) pointer 43, an empty SCB pointer 44, task control blocks (TCBs) 45, and workload management information 46. The contents of these information will be described below.

Figure 6:
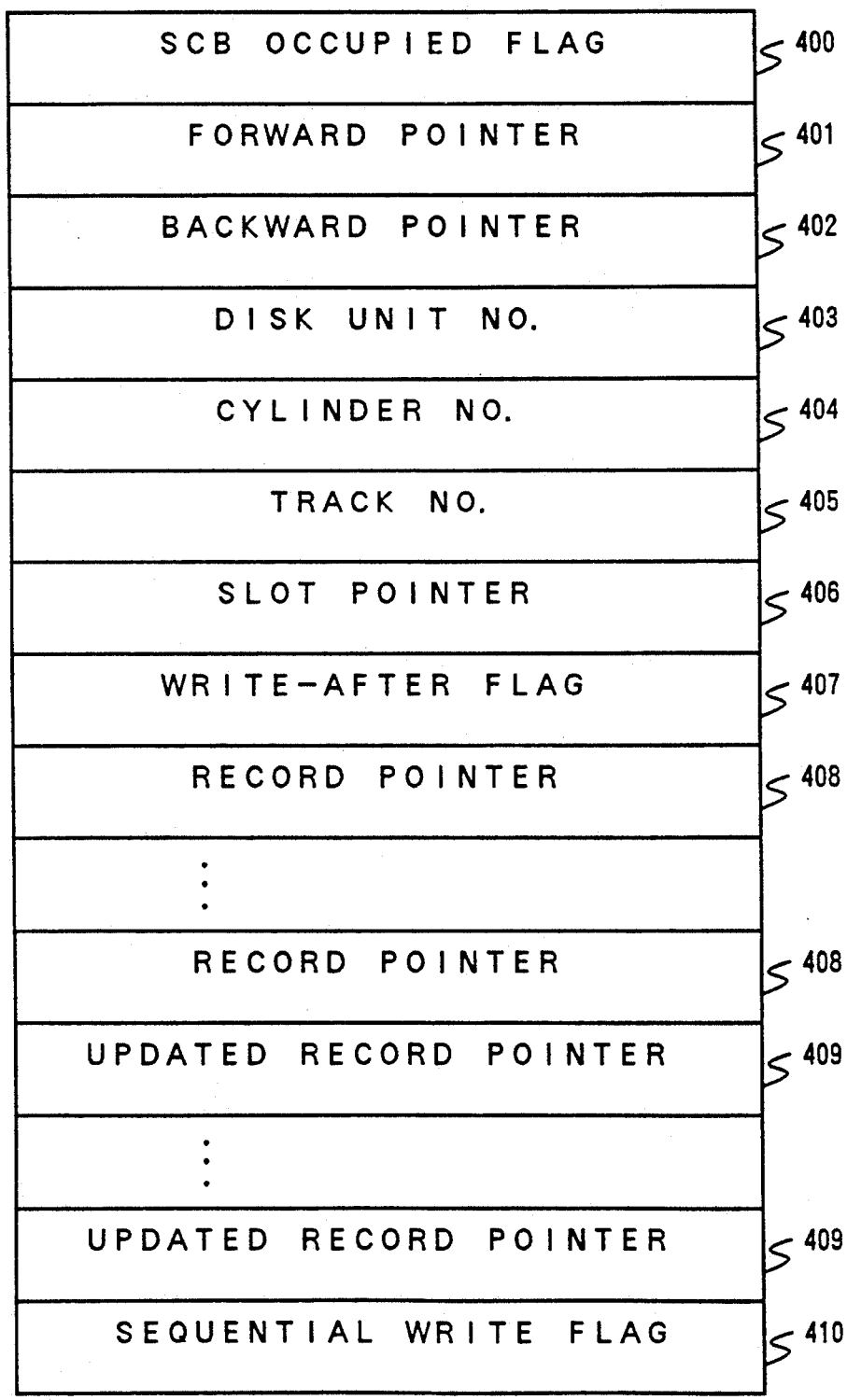
FIG. 6 shows the structure of a slot control block (SCB).
Figure 7:
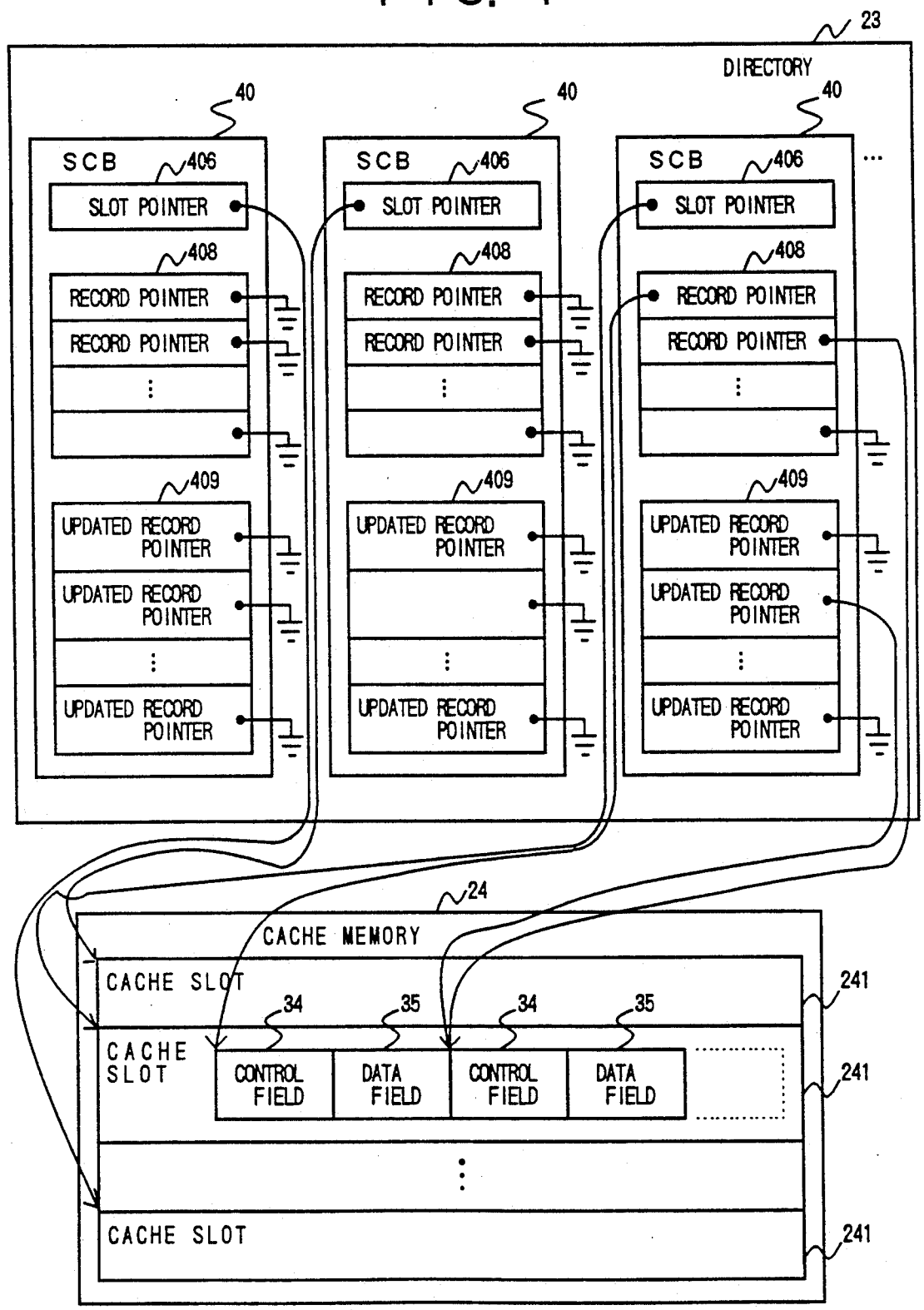
FIG. 7 is a schematic diagram showing the relation between SCBs and cache slots.

First, the relation between the contents of SCB 40 and the cache memory 24 will be described with reference to FIGS. 6 and 7. FIG. 6 shows the contents of SCB 40. FIG. 7 shows the relation between SCBs 40 and cache slots. The cache memory 24 is divided into units called cache slots 241. One cache slot corresponds to a capacity capable of storing one track data. SCBs 40 are information for managing cache slots 241.

An SCB occupied flag 400 shown in FIG. 6 is a flag indicating a use state of SCB, the flag turning on while SCB is used. A forward pointer 401 and a backward pointer 402 are used when chaining SCBs 40 in the MRU order. How these pointers are used will be described later with reference to FIG. 8. A disk unit number 403, cylinder number 404 and track number 405 store the numbers of the disk unit, cylinder and track, respectively managed by SCB 40. A slot pointer 406 indicates a cache slot 241 managed by SCB 40. A write-after flag 407 is a flag indicating whether the slot 241 stores write-after data. If the write-after flag is on, it means that write-after data is being stored.

A record pointer 408 indicates the start position of the record 33 of the cache slot 241. An updated record pointer 409 indicates the start position of the record 33 of the cache slot 241 storing write-after data. Record pointers 408 and updated record pointers 409 are provided as many number as the maximum number of records 33 capable of being stored in the track 29. A null value is set to the record pointer 408 to the record 33 of the cache slot 29 not storing data, and set to the updated record pointer 409 to the record not storing write-after data. A sequential write flag indicates whether write-after data was written in a cache memory upon a sequential access request from CPU 20.

Figure 8:
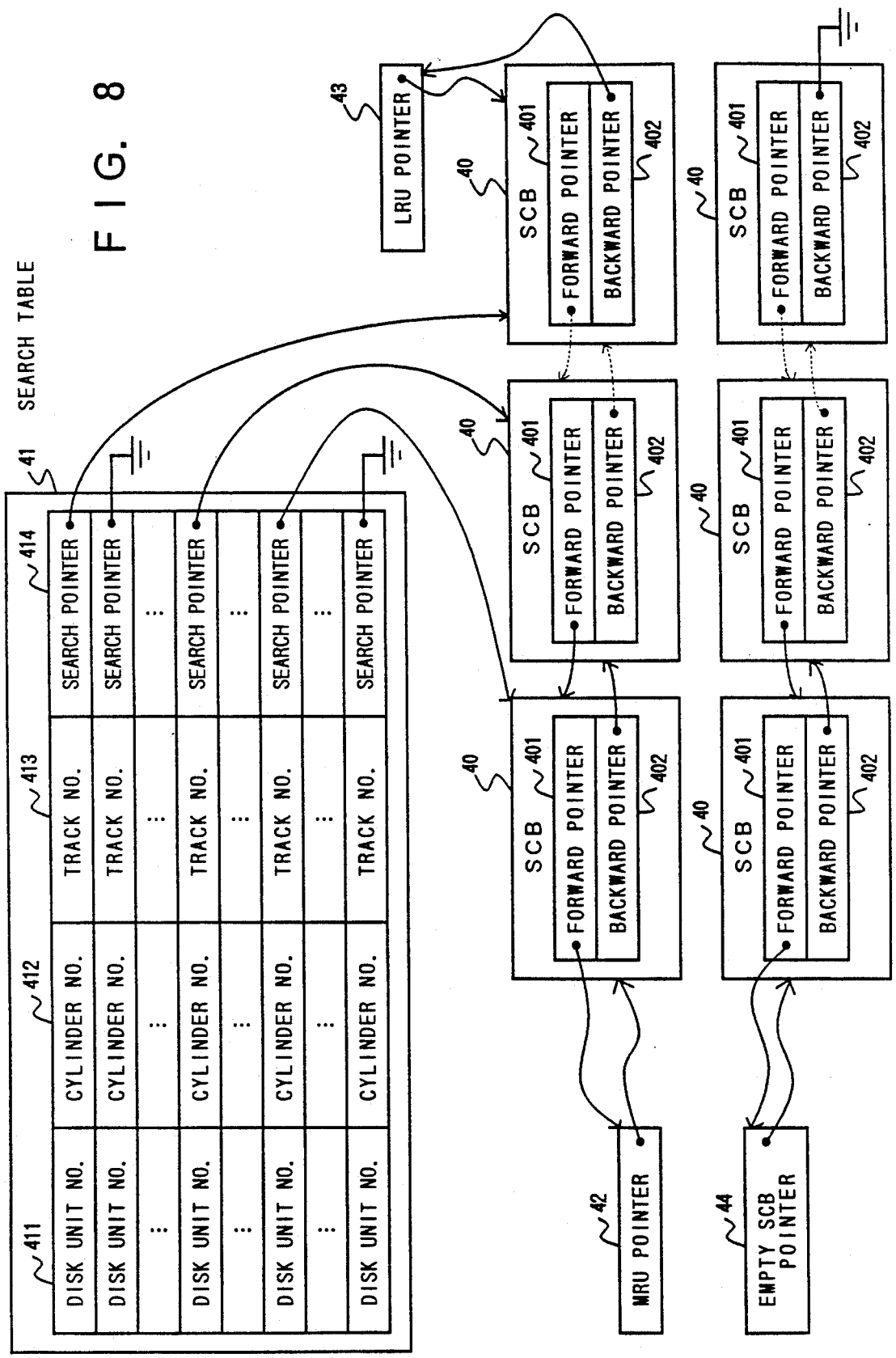
FIG. 8 is a schematic diagram showing the relation between a search table and SCBs.

FIG. 8 shows the relation between the search table 41 and SCBs 40. The search table 41 has disk unit numbers 411, cylinder numbers 412, track numbers 413 and search pointers 414. This search table is used for checking whether data in a certain track of a disk unit is being stored in the cache memory 24. Each track 29 has the search pointer 414 to SCB 40. If the search pointer 414 points SCB 40, it means that data in the track 29 is being stored in the cache memory 24. If the search pointer 414 has a null value, then data in the track 29 is not stored in the cache memory 24. Search pointers of the search table 41 are provided as many number as the number of tracks 29 of disk units 25 connectable to the controller 21.

SCBs 40 allocated to tracks 29 are chained by the MRU pointer 42, LRU pointer 43, forward pointers 401 and backward pointers 402. The forward pointers 401 and backward pointers 402 are used for chaining SCBs 40 allocated to tracks 29 in the MRU order. The MRU pointer 42 points SCB 40 allocated to the track 29 which was used for data input/output most recently. The LRU pointer 43 points SCB 40 allocated to the track 29 which was used for data input/output least recently.

SCBs 40 not allocated to tracks 29 are chained by the empty SCB pointer 44, and forward pointers 401 and backward pointers 402. The empty SCB pointer 44 is the start pointer to one of SCBs for chaining SCBs 40 not allocated to tracks 29. The remaining SCBs not allocated to tracks 29 are chained by the forward pointers 401 and backward pointers 402. If there is no SCB 40 not allocated to a track 29, the empty SCB pointer 44 is set to a null value.

Figure 9:
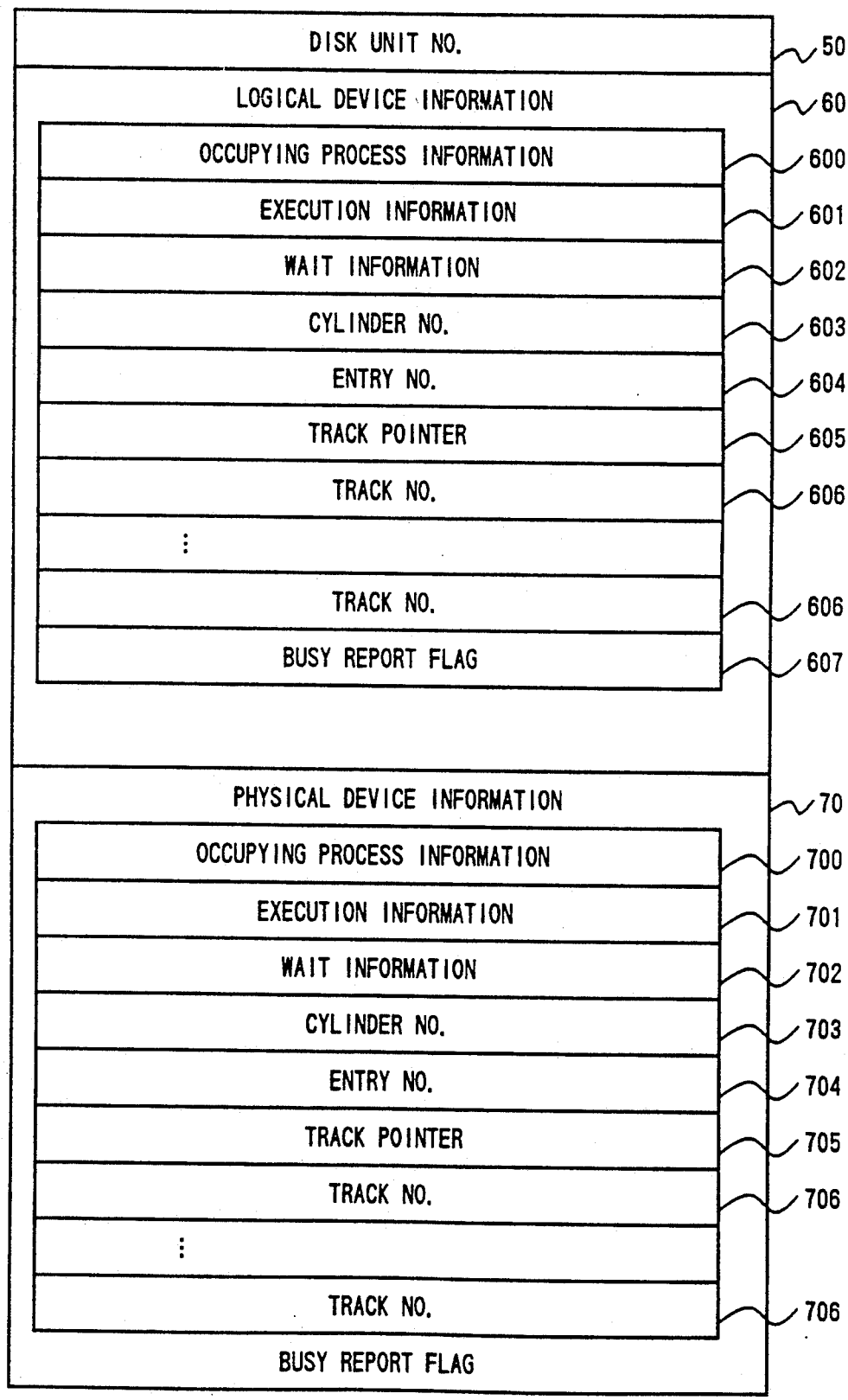
FIG. 9 shows the contents of a task control block (TCB).

FIG. 9 shows the contents of the task control block (TCB). TCB 45 is information for managing a task under execution by the controller 21. TCB 45 is provided for each disk unit 25, and has a disk unit number 50, a logical device number 60 and a physical device number 70.

First, a logical device and physical device will be described.

Data transfer processes executed by the director 22 includes a data transfer process between CPU 20 and a disk unit 25, a data transfer process between CPU 20 and the cache memory 24, and a data transfer process between the cache memory 24 and a disk unit 25. Although the data transfer process between the cache memory 24 and a disk unit 25 is executed using the disk unit, the data transfer process between CPU 20 and the cache memory 24 is executed without using a disk unit 25. Therefore, both the data transfer processes can be executed independently from each other.

For executing the data transfer between CPU 20 and the cache memory 24, a logical device is used so as to allow exclusive execution of the CPU-cache data transfer processes. For executing the data transfer between the cache memory 24 and a disk unit 25, a physical device is used so as to allow exclusive execution of the cache-disk data transfer processes. Therefore, for the data transfer process between CPU 20 and the cache memory 24, the logical device performs exclusive control, and for the data transfer process between the cache memory 24 and a disk unit 25, the physical device performs exclusive control. For the data transfer process between CPU 20 and a disk unit 25, both the logical and physical devices are used.

The contents of TCB 45 shown in FIG. 9 will be described below. The disk unit number 50 is the number of a disk unit which is controlled by using TCB 45. The logical device information 60 is information of the data transfer process between CPU 20 and the cache memory 24, and includes the following information.

Occupying process information 600 indicates a kind of a process which is occupying the logical device. Execution information 601 indicates a task execution state. The execution state includes an idle state, a ready state, a run state, and a wait state. The idle state means that there is no process using the logical device. The ready state means that the director can execute the process occupying the logical device. The run state means that the process occupying the logical device is now under execution. The wait state means that the process occupying the logical device waits for a release of a cause indicated by wait information 602. When a wait state is released, the state is changed into ready. When the director detects the process with ready state, it changes state into run, and starts executing the process. The wait information 602 provides a cause of the wait state as indicated by the execution information 601. The cause of the wait state includes a logical device wait, an SCB wait, and a cache allocation wait. The logical device wait is the state of waiting for the idle state of the logical device because the process occupying the logical device now uses the disk unit 25. The SCB wait is the state of waiting for the idle state of SCB 40 to be occupied by the process which occupies the physical device. The cache allocation wait is the state of waiting until the write-after data amount becomes less than the limit value.

A cylinder number 603 indicates the number of a cylinder of the track 29 to be processed. An entry number 604 indicates the number of entries recorded in a track list. The track list records track numbers 606 to be processed, each number corresponding to one entry. The track number 606 is the number of a track to be processed. A track pointer 604 points an entry of the track list corresponding to a track to be processed. A busy report flag 607 indicates whether CPU 20 was informed of a busy state of the disk unit 25. If this flag is on, it means that a busy state was informed to CPU 20.

The physical information 70 is information of the data transfer process between CPU 20 and the disk unit 25 and the data transfer process between the cache memory 24 and the disk unit 25. The physical information includes occupying process information 700, execution information 701, cylinder number 703, entry number 704, track pointer 705 and track number 706, respectively corresponding to the occupying process information 600, execution information 601, cylinder number 603, entry number 604, track pointer 605 and track number 606 of the logical device information 60. The wait information 702 indicates a cause of a wait state as indicated by the execution information 701. A cause of the wait state includes a positioning wait.

Figure 10:
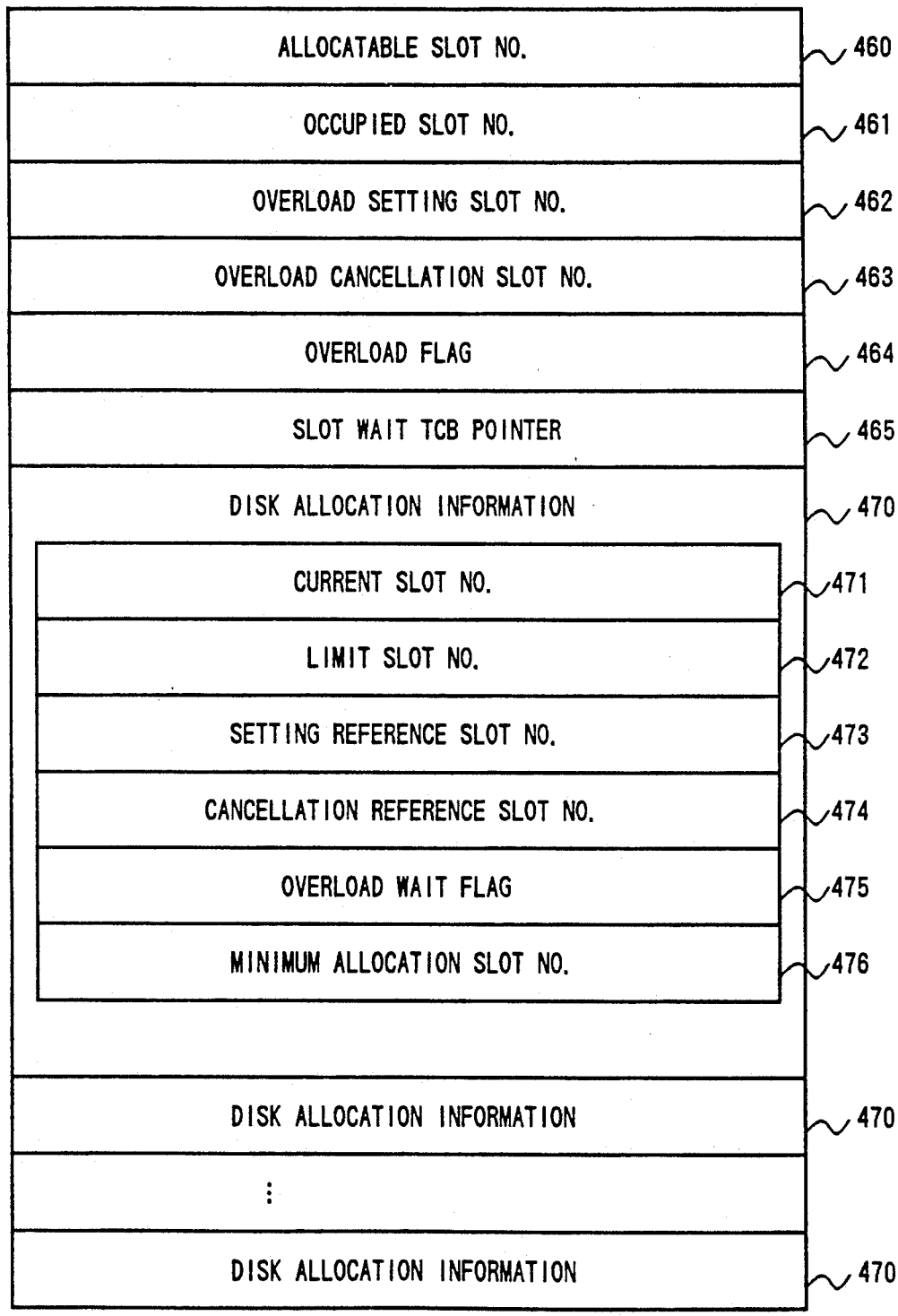
FIG. 10 shows the contents of load management information.

FIG. 10 shows the contents of the workload management information 46 which is used for management of a write-after data occupying state of the cache memory 24. An allocatable slot number 460 indicates the number of cache slots 241 allocatable to write-after data. An occupied slot number 461 indicates the number of cache slots occupied by write-after data within the cache memory 24. An overload setting slot number 461 indicates the number of cache slots 241 at which a cache overload is set. An overload cancellation slot number 463 indicates the number of cache slots 241 at which the cache overload is canceled. An overload flag 464 indicates an overload state from when the number of cache slots 241 occupied by write-after data becomes the overload setting slot number 462 or more, to when it becomes less than the overload cancellation slot number 463. A disk wait TCB pointer 465 points TCB 45 relative to which CPU 20 has a waiting input/output request.

Disk allocation information 470 is provided for each disk unit 25, and includes a current slot number 471, limit slot number 472, setting reference slot number 473, cancellation reference slot number 474, overload wait flag 475, and minimum allocation slot number 476. The current slot number 471 indicates the number of cache slots 241 allocated to the disk unit 25 and stored write-after data. The limit slot number 472 indicates the number of cache slots 241 allocatable to the disk unit 25 for storing write-after data. The setting reference slot number 473 indicates the number of cache slots 241 which is used as a reference to determining the limit slot number 472. The cancellation reference slot number 474 indicates the number of cache slots 241 which is used as a reference to canceling the limit slot number 472. As an invalid number for the limit slot number 472, setting reference slot number 473 and cancellation slot number 474, a null value is set. The overload wait flag 475 indicates the state of waiting for allocation of a cache slot 241 because the current slot number 471 is the limit slot number 472 or more. The minimum allocation slot number 476 is the minimum number of cache slots 241 to be allocated to the disk unit 25.

Figure 11:
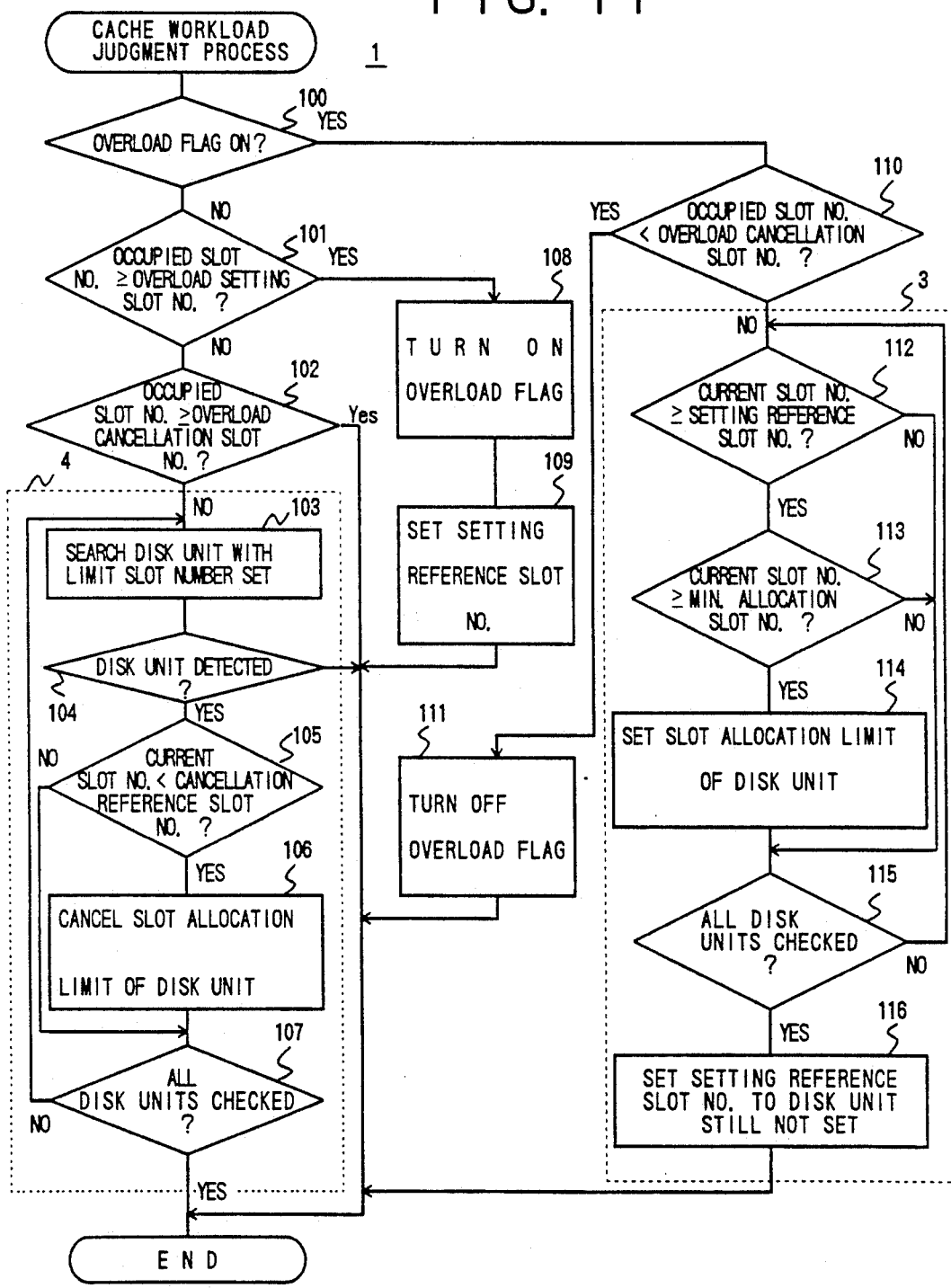
FIG. 11 is a flow chart of a cache workload judgment process.

FIG. 11 is a flow chart showing the cache workload judgment process 1. This process judges a workload of the cache memory 24 basing upon the number of cache slots 241 occupied by write-after data. In this embodiment, stored in advance as the workload management information 46 are the allocatable slot number, overload setting slot number, overload cancellation slot number and minimum allocation slot number. It is noted that an overload state of cache slots 241 storing write-after cannot be discriminated unless the overload setting number is equal to or smaller than the allocatable slot number. The overload cancellation slot number is equal to or smaller than the overload setting slot number.

At step 100 it is judged whether the overload flag 464 is on. If on, the flow advances to step 110, and if not, the flow advances to step 101. At the step 101, it is judged whether the occupied slot number is equal to or larger than the overload setting slot number 462. If the condition is satisfied, the flow advances to step 108, and if not, the flow advances to step 102. At the step 102, it is judged if the occupied slot number is equal to or larger than the overload cancellation slot number. If the condition is satisfied, the process is terminated, and if not, the flow advances to step 103. Steps 103 to 107 are an allocation limit cancellation process 4 which cancels an allocation limit of cache slots to a disk unit 25 set with the limit slot number. At the step 103, a disk unit 25 set with the limit slot number is searched. At step 104 it is checked whether a disk unit 25 set with the limit slot number has been detected. If detected, the flow advances to step 105, and if not, the process is terminated. At the step 105, it is judged whether the current slot number is smaller than the cancellation reference slot number. If the condition is satisfied, the flow advances to step 106, and if not, the flow advances to step 107. At the step 106, in order to cancel a limit of the disk unit 25, the limit slot number, setting reference slot number and cancellation reference slot number are set to a null value. At step 107, it is judged whether all disk units 25 have been checked. If not, the flow returns to the step 103, and if all disk units have been checked, the process is terminated.

Steps 108 and 109 set an overload state of the cache memory. At the step 108, the overload flag 464 is turned on. At the step 109, the current slot number for each disk unit 25 is set as the setting reference slot number.

At the step 110, it is judged whether the occupied slot number 461 is smaller than the overload cancellation slot number 463. If the condition is satisfied, the flow advances to step 111, and if not, the flow advances to step 112. At the step 111, the overload flag 464 is turned off to terminate the process. Steps 112 to 116 are an allocation limit setting process 3 which sets allocation limit of cache slots 241 to each disk unit 25. At the step 112, it is judged whether the current slot number id equal to or larger than the setting reference slot number. If the condition is satisfied, the flow advances to step 113, and if not, the flow advances to step 115.

At the step 113, it is judged whether the current slot number is equal to or larger than the minimum allocation slot number. If the condition is satisfied, the flow advances to step 114, and if not, the flow advances to step 115. At the step 114 the limit slot number and cancellation reference slot number for each disk unit 25 are set. Namely, the current slot number is set as the limit slot number, and the setting reference number is set as the cancellation reference slot number. As the cancellation reference slot number, a predetermined fraction of the current slot number may be set. At the step 115, it is judged whether all disk units 25 have been checked. If not, the flow returns to the step 112, and if all disk units 25 have been checked, the flow advances to step 116. At the step 116, the current slot number is set as the setting reference slot number to the disk unit 25 which is not set with the setting reference slot number.

Figure 12:
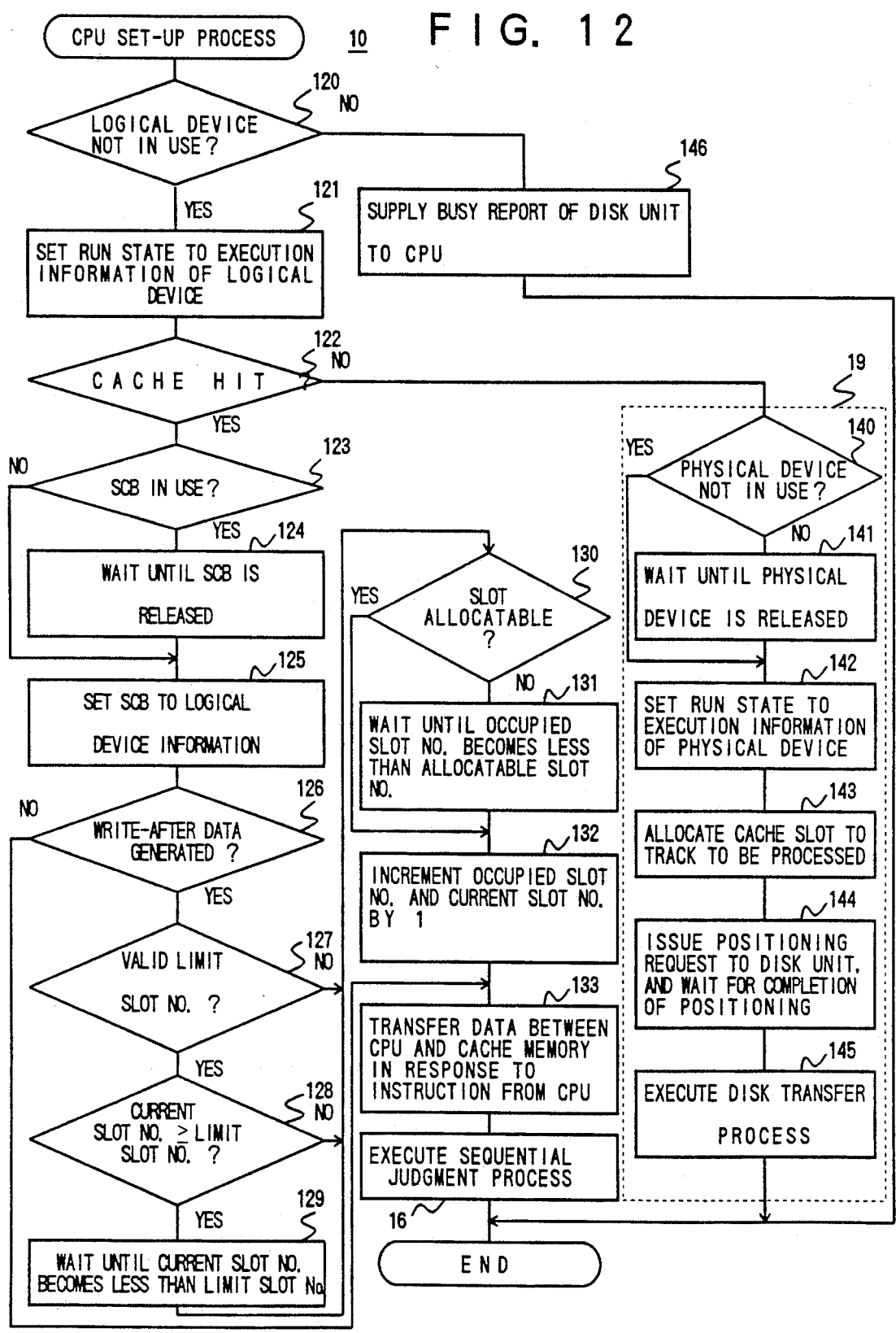
FIG. 12 is a flow chart of a CPU set-up process.

FIG. 12 is a flow chart of the CPU set-up process 10 which transfers data between CPU 20 and the disk unit 25 and between CPU 20 and the cache memory 24 in response to an instruction from CPU 20 to the controller 21. At step 120, it is judged from the execution information 501 whether the logical device corresponding to the disk unit 25 designated by CPU 20 is used. If not used, the flow advances to step 121, and if used, the flow advances to step 146. At the step 121, the CPU set-up process is set to the occupied process information 600, and a run state is set to the execution information 601. At step 122, it is judged whether the contents of the track 29 designated by CPU exist in the cache memory 24. Specifically, the search table 41 is referred to, and if the search pointer 414 to the track 29 is not a null value, it means that the contents of the track 29 exist in the cache memory 24. This judgment corresponds to the cache hit/miss judgment 11. In the case of a cache hit, the flow advances to step 123, and in the case of a cache miss, the flow advances to step 140.

Steps 123 to 133 correspond to the cache hit process 12. At the step 123, it is judged from the SCB occupied flag 400 whether SCB 40 for the track 29 is used by another process. If used, the flow advances to step 124, and if not used, the flow advances to step 125. At the step 124, a wait state is set as the execution information 601 of the logical device, and an SCB wait is set as the wait information 602 to wait until SCB 40 is released. At the step 125, the contents of the logical device information 60 are set. Specifically, a run state is set as the execution information 601, "1" is set as the entry number 604, a pointer to the start entry is set as the track pointer 605, and the cylinder number 603 and track number 606 are set for the track 29 to be processed. At step 126, it is judged from an instruction from CPU 20 whether new write-after data is to be generated for the track. If it is to be generated, the flow advances to step 127, and if not, the flow advances to step 130. At the step 127, it is judged whether the limit slot number is valid. It is assumed here that the limit slot number is valid if it is not a null value. If valid, the flow advances to step 128, and if invalid, the flow advances to step 130. At the step 128, it is judged if the current slot number is equal to or larger than the limit slot number. If the condition is satisfied, the flow advances to step 129, and if not, the flow advances to the step 130. At the step 129, a wait state is set as the execution information 601, a cache allocation wait state is set as the wait information 602 to wait until the current slot number becomes smaller than the limit slot number.

At the step 130, it is judged from the allocatable slot number and occupied slot number whether the write-after data is allocatable to the cache slot 241. If allocatable, the flow advances to step 132, and if not, the flow advances to step 131. At the step 131, a wait state is set as the execution information 601, and a cache wait state is set as the wait information 602 to wait until the occupied slot number becomes smaller than the allocatable slot number. At the step 132, the occupied slot number and current slot number each are incremented by "1". At step 133, data is transferred between CPU 20 and the cache memory 24, in response to an instruction from CPU 20. If the record 33 in the cache memory 24 is updated, the write-after flag 407 is turned on, and the updated record pointer 409 is set. If CPU 20 requests a sequential access and generates write-after data, the sequential write flag 410 is turned on. At step 16, the sequential judgment process is executed. This process is shown in FIG. 14.

Steps 140 to 145 correspond to the CPU disk transfer process 19. At step 140, it is judged from the execution information 701 whether the physical device for the disk unit 25 is used. If not used, the flow advances to step 142, and if used, the flow advances to step 141. At the step 141, a wait state is set as the execution information 601, and a physical device wait state is set as the wait information 602 to wait until the physical device is released. At the step 142, the CPU set-up process is set as the occupied process information 700, and a run state is set as the execution information. At step 143, the cache slot 241 is allocated to the track 29, and information is set to TCB 45. Specifically, the SCB occupied flag 400 is turned on, and the disk unit number, cylinder number and track number, respectively for the track 29, are set to the disk unit number 403, cylinder number 404 and track number 405. The cylinder number corresponding to the track 29 is set to the cylinder number 703, and the number of the track 29 is set to the track number 706. The number of tracks 29 whose numbers have been set as track numbers 706 is set to the entry number 704, and a pointer to the start entry is set as the track pointer 705. At step 144, the disk unit 25 is requested to move the head to the record 33 designated by CPU 20, and a completion of this positioning is waited. At step 145, the disk transfer process is executed, the contents of which are shown in FIG. 13.

Figure 13:
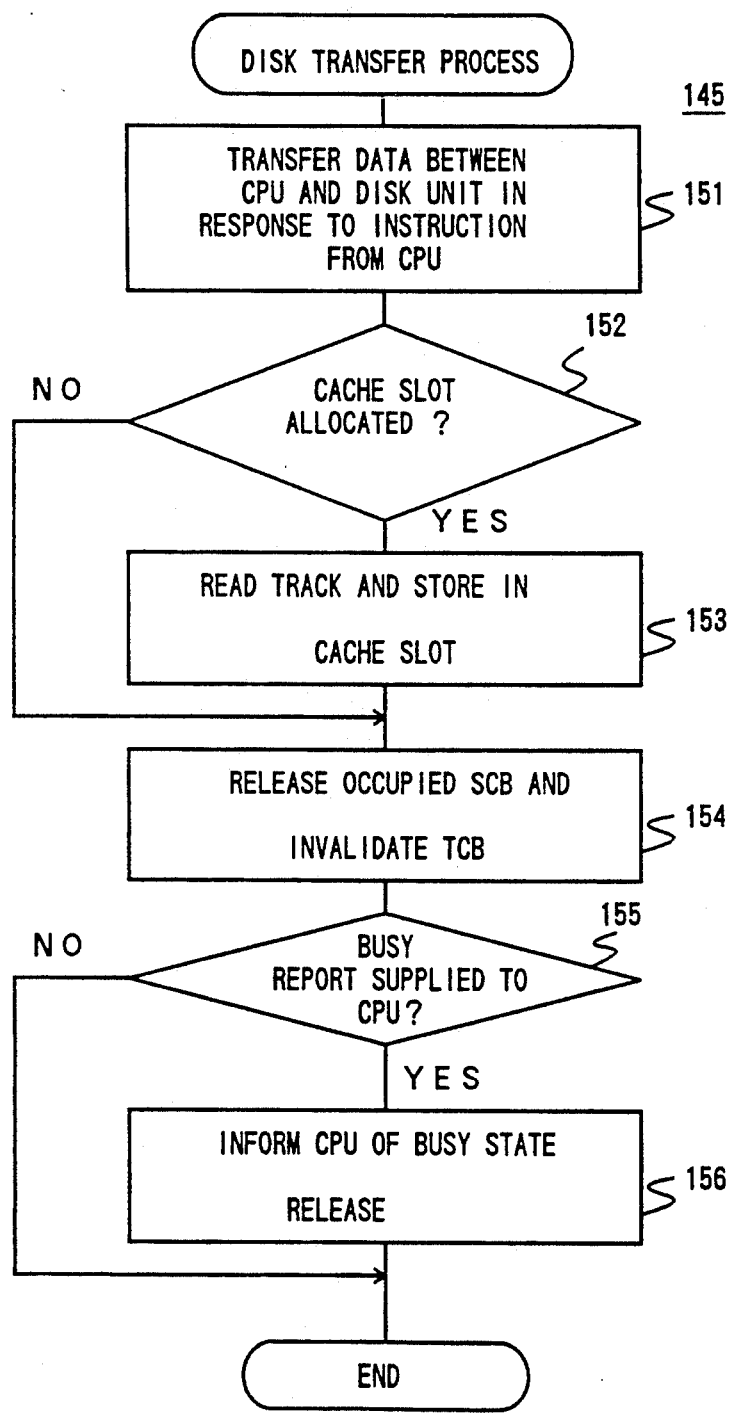
FIG. 13 is a flow chart of a disk transfer process.

FIG. 13 is a flow chart of the disk transfer process corresponding to the step 145. At step 151, data is transferred between CPU 20 and the disk unit 25, in response to an instruction from CPU 20. At step 152, it is judged whether a cache slot 241 has been allocated to the track 29. If allocated, the flow advances to step 153, and if not, the flow advances to step 154. At the step 153, the contents of the track 29 are read and stored in the allocated cache slot 241. At this time, the record pointer 408 is set. At step 154, the contents of TCB 45 are invalidated. Specifically, the SCB occupied flag 400 of the occupied SCB 40 is first turned off to release SCB 40. Then, occupied process information 600 for logical device is set with a null value, an idle state is set as the execution information 601, the occupied process information 700 for the physical device is set with a null value, and an idle state is set as the execution information 701. At step 155, it is judged from the busy report flag 607 whether CPU has been informed of a busy state. If informed, the flow advances to step 156, and if not, the flow terminates. At the step 156, the busy report flag is turned off and a busy release report is supplied to CPU 20.

Figure 14:
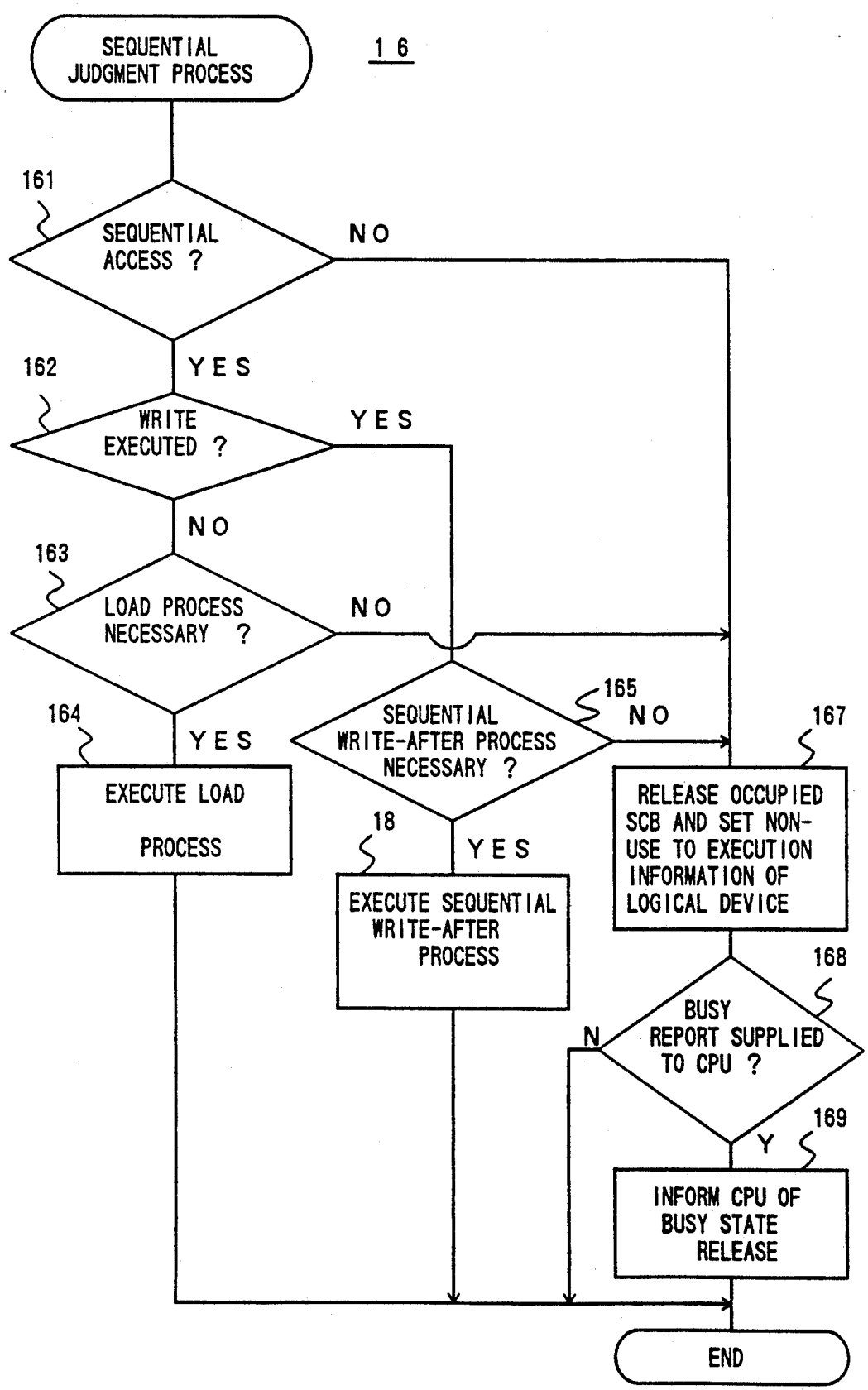
FIG. 14 is a flow chart of a sequential judgment process.
Figure 15:
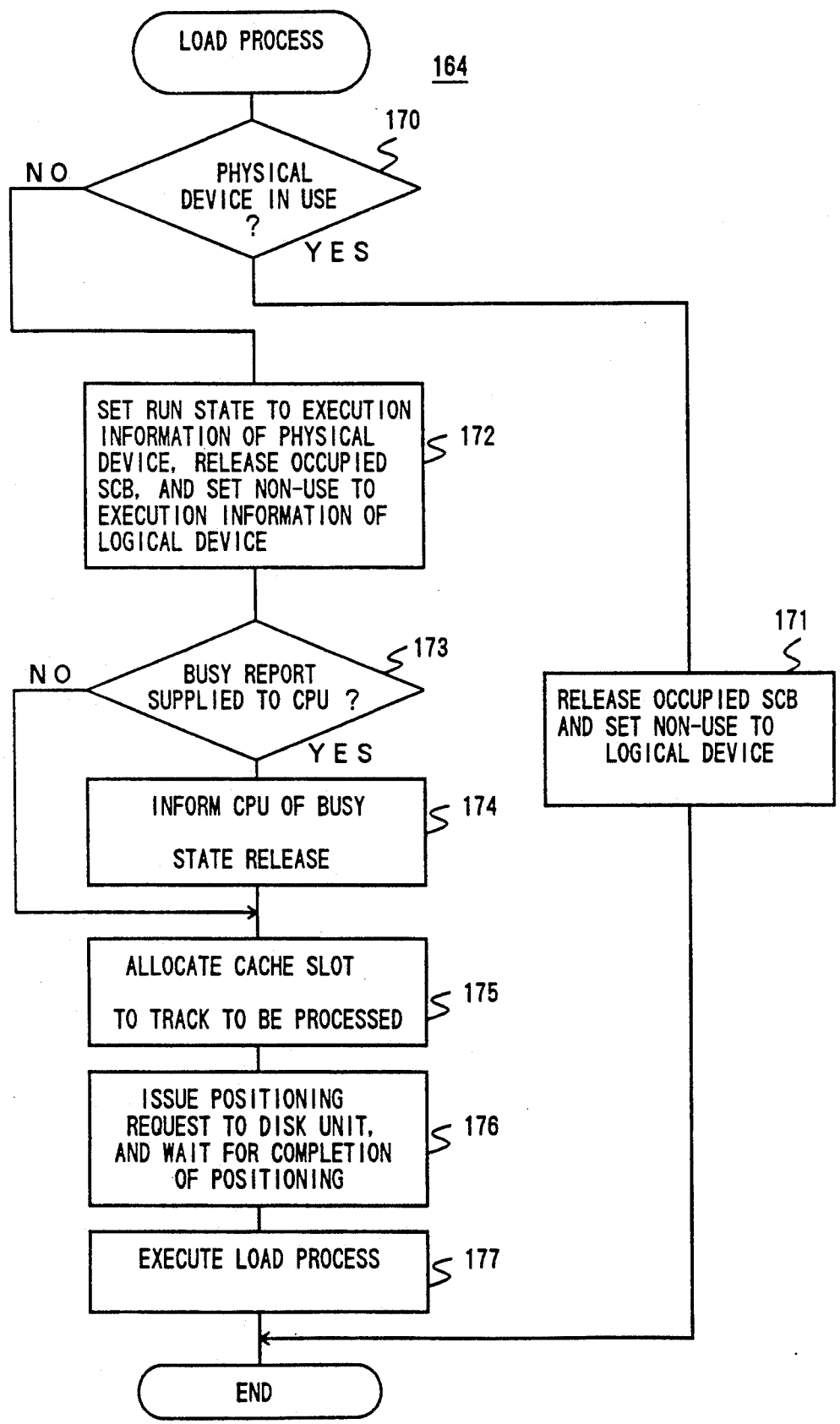
FIG. 15 a flow chart of a load process.

FIG. 14 is a flow chart of the sequential judgment process. At step 161, it is judged whether an instruction from CPU 20 is a sequential access. If so, the flow advances to step 162, and if not, the flow advances to step 167. At the step 162, it is judged whether the CPU set-up process has executed a write operation. If executed, the flow advances to step 165, and if not, the flow advances to step 163. At the step 163, it is judged whether a load process is necessary. If necessary, the flow advances to step 164, and if not, the flow advances to step 167. At the step 164, a load process is executed. The load process is shown in FIG. 15. At the step 165, it is judged whether the sequential write-after process is necessary. Namely, it is judged whether the number of cache slots storing write-after data which corresponds to the track with smaller track number than the subject track in same cylinder of same disk unit and has the turned-on sequential write flag is a predetermined number or more. If there are cache slots equal to or more than the predetermined number, the flow advances to step 18, and if not, the flow advances to step 167. At the step 18, the sequential write-after process is executed. This process is shown in FIG. 16.

At the step 167, the SCB occupied flag 400 of the occupied SCB 40 is turned off to release SCB 40, and an idle state is set as the execution information 601 for the logical device. At step 168, it is judged from the busy report flag 607 whether CPU 20 has been informed of a busy state. If informed, the flow advances to step 169, and if not, the flow terminates. At the step 169, the busy report flag is turned off, and CPU 20 is supplied with a busy release report.

FIG. 15 is a flow chart of the load process corresponding to the step 164. At step 170, it is judged from the execution information 701 for the physical device whether the physical device is used. If not, the flow advances to step 172, and if used, the flow advances to step 171. At the step 171, the SCB occupied flag 400 of the occupied SCB 40 is turned off to release SCB 40, and an idle state is set as the execution information 601 for the logical device, to thereafter terminate the process. At the step 172, the load process is set as the occupied process information 700 for the physical device, a run state is set as the execution information 700, the SCB occupied flag 400 of the occupied SCB 40 is turned off to release SCB 40, a null value is set as the occupied process information 600, and an idle state is set as the execution information 601. At step 173, it is judged from the busy report flag 607 whether CPU 20 has been supplied with the busy report. If supplied, the flow advances to step 174, and if not, the flow advances to step 175. At the step 174, the busy report flag 452 is turned off, and a busy release report of the disk unit 25 is supplied to CPU 20. At the step 175, the cache slot 241 is allocated to the track 29 for which the load process is executed, and the physical device information 70 is set. Specifically, the SCB occupied flag 400 is turned on, the cylinder number and track number of the track 29 allocated with the cache slot 241 are set to the cylinder number 455 and track number 706, respectively, the number of tracks 29 whose numbers have been set as track numbers 706 is set to the entry number 456, and a pointer to the first entry is set to the track pointer 457. At step 176, the disk unit 25 is supplied with a positioning request, and a completion of this positioning is waited. At step 177, a load execution process is executed. This process is shown in FIG. 17.

Figure 16:
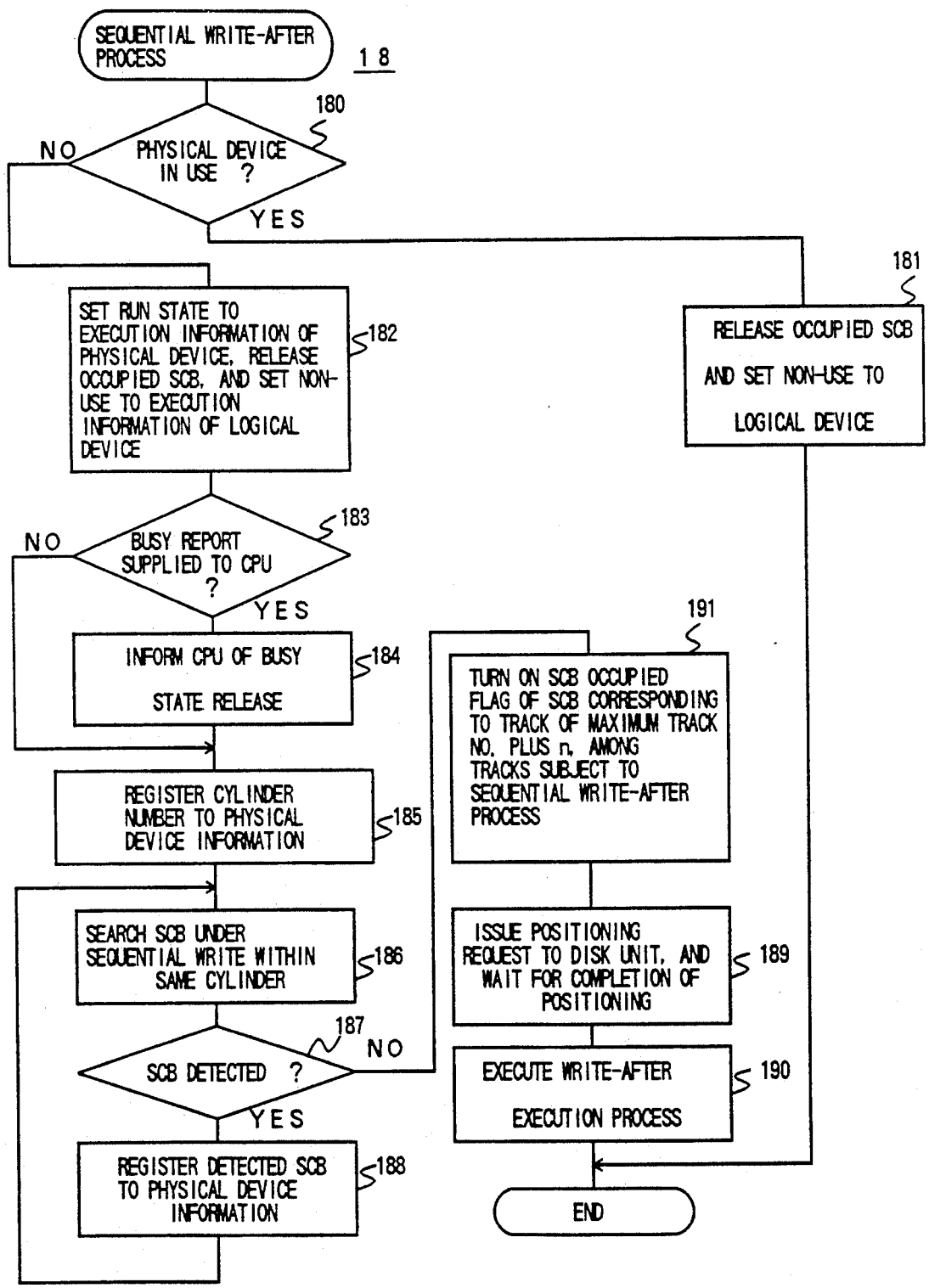
FIG. 16 is a flow chart of a sequential write-after process.
Figure 19:
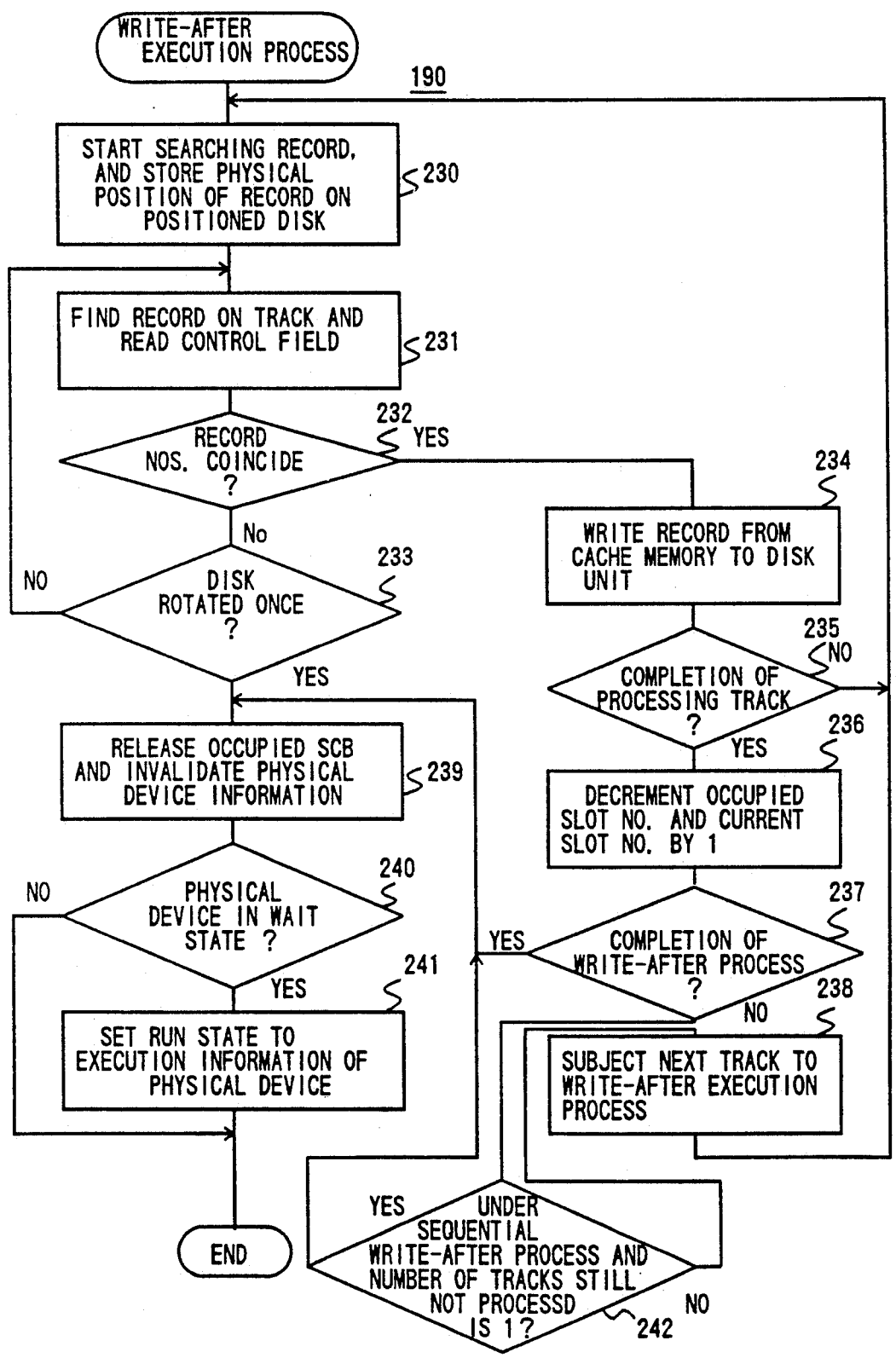
FIG. 19 is a flow chart of a write-after execution process.

FIG. 16 is a flow chart of the sequential write-after process corresponding to the step 18. At step 180, it is judged from the execution information 701 of the physical device whether it is used. If not used, the flow advances to step 182, and if used, the flow advances to step 181. At the step 181, the SCB occupied flag 400 of the occupied SCB 40 is turned off to release SCB 40, and an idle state is set as the execution information 601 for the logical device, to thereafter terminate the process. At the step 182, the sequential write-after process is set as the occupied process information 700 for the physical device, a run state is set as the execution information 701, a null value is set to the occupied process information 600 for the logical device, and an idle state is set as the execution information 601. At step 183, it is judged from the busy report flag 607 whether CPU 20 has been supplied with a busy report. If supplied, the flow advances to step 184, and if not, the flow advances to step 185. At the step 184, the busy report flag 607 is turned off, and a busy release report for the disk unit 25 is supplied to CPU 20. At step 185, the physical device information 70 for the detected disk unit 25 is set. Specifically, the number of the subject cylinder is set to the cylinder number 703, the entry number 704 is set to "0", and a pointer to the first entry is set to the track pointer 705. At step 186, SCB 40 is searched which corresponds to the track 29 with smaller track number than track processed at the step 172 in same cylinder of same disk unit and has the turned-on sequential write-after flag 410. At step 187, it is checked if SCB corresponding to the track 29 has been detected. If detected, the flow advances to step 188, and if not, the flow advances to step 191. At the step 188, the detected SCB 40 is registered in the physical device information 70. Specifically, the track number 706 is set, the entry number 704 is incremented by "1", to thereafter return to the step 186. At the step 191, the SCB occupied flag 400 of SCB 40 is turned on, SCB 40 corresponding to the track number obtained by adding n to the track number having the largest cylinder number and track number, among tracks subject to the sequential write-after process. If the track is not allocated to SCB 40, new SCB 40 is allocated and thereafter the SCB occupied flag 400 is turned on. The step 191 functions such that the number of new tracks to be subject to the sequential write-after process after the present track is limited to n at most. At step 189, a positioning request is issued to the disk unit 25, and a completion of this positioning is waited. At step 190, a write-after execution process is executed, the contents of which are shown in FIG. 19.

Figure 17:
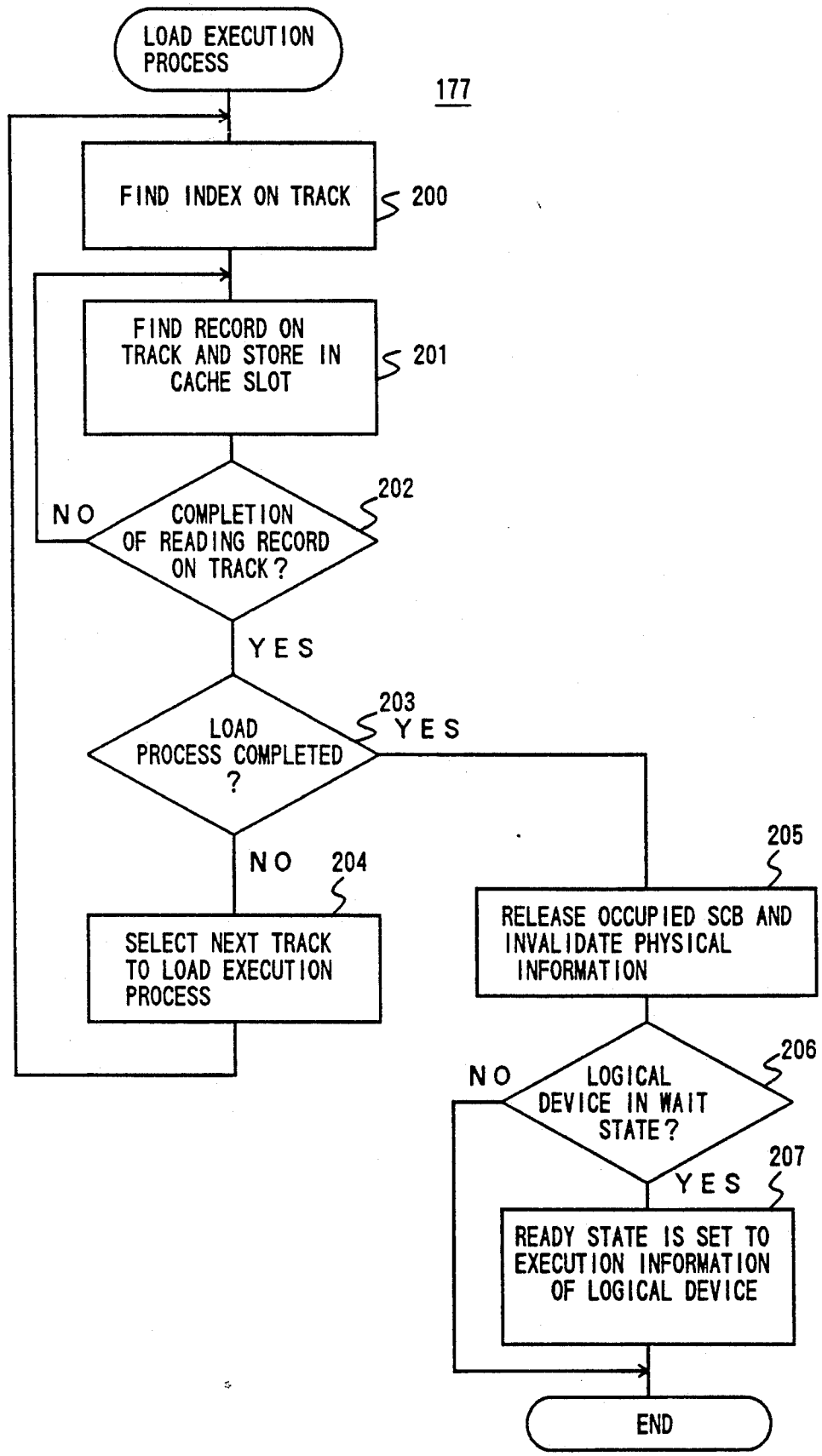
FIG. 17 is a flow chart of a load execution process.

FIG. 17 is a flow chart of the load execution process corresponding to the step 177. At step 200, the index 30 of the track number 706 indicated by the track pointer 705 is located. At step 201, the record 33 of the track 29 is detected and read to store data in the cache slot 241.

In this case, the position of the record 33 on the cache slot 241 is set to the record pointer 408. At step 202, it is checked whether reading the record 33 of the track 29 has been completed. If completed, the flow advances to step 203, and if not, the flow returns to the step 201. At the step 203, it is checked if the load process for all tracks 29 presented in the physical device information 70 has been completed. If not, the flow advances to step 204, and if completed, the flow advances to step 205. At the step 204, the next track undergoes the load execution process. Specifically, the track pointer 705 is updated to indicate the next entry. After this step 204, the flow returns to step 200. At the step 205, the SCB occupied flag 400 of the occupied SCB 40 is turned off to release SCB 40, a null value is set as the occupied process information 700 for the physical device, and an idle state is set as the execution information 701. At step 206, it is judged from the execution information 601 for the logical device information 60 whether the logical device is of a wait state. If wait state, the flow advances to step 207, and if not, the process is terminated. At the step 207, a ready state is set as the execution information 601 of the logical device information.

Figure 18:
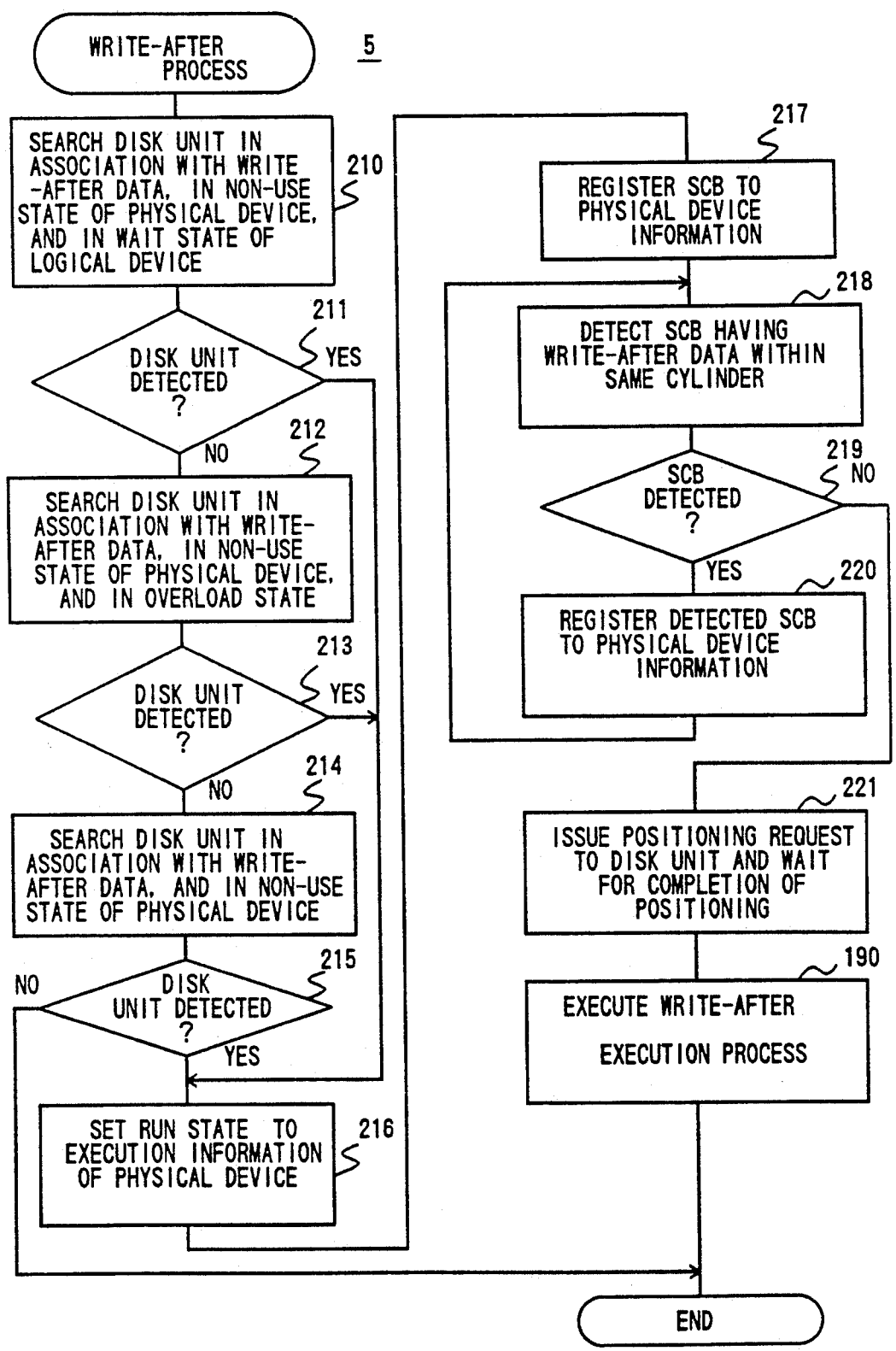
FIG. 18 is a flow chart of a write-after process.

FIG. 18 is a flow chart of the write-after process 5 which is executed while the director 22 is idle. At step 210, searched is a disk unit 25 which is in association with write-after data, and has an idle physical device, and the logical device of a slot wait state. Specifically, while tracing SCBs 40 from the LRU pointer 43, SCB 40 is searched which has associated write-after data as indicated by the write-after flag 407 and the turned-off SCB occupied flag 400. Then, it is judged from the execution information 701 of the physical device whether the disk unit 25 corresponding to the detected SCB 40 is not used, and judged from the execution information 601 and wait information 602 of the logical device whether the disk unit 25 is of a slot wait state. At step 211, it is checked if the disk unit 25 was detected at the step 210. If detected, the flow advances to step 216, and if not, the flow advances to step 212. At the step 212, searched is a disk unit 25 which is in association with write-after data and has the physical device of an idle state, and is of an overload state. Specifically, while tracing SCBs 40 from the LRU pointer 43, SCB 40 is searched which has associated write-after data as indicated by the write-after flag 407 and has the turned-off SCB occupied flag 400. Then, it is judged from the execution information 701 of the physical device whether the disk unit 25 corresponding to the detected SCB 40 is usable, and judged from the limit slot number 472 whether the disk unit 25 is of an overload state.

At step 213, it is checked if the disk unit 25 was detected at the step 212. If detected, the flow advances to step 216, and if not, the flow advances to step 214. At the step 214, searched is a disk unit 25 which is in association with write after data and has the physical device of an idle state. Specifically, while tracing SCBs 40 from the LRU pointer 43, SCB 40 is searched which has associated write-after data as indicated by the write-after flag 407 and has the turned-off SCB occupied flag 400. Then, it is judged from the execution information 701 of the physical device whether the disk unit 25 corresponding to the detected SCB 40 is usable. At step 215, it is checked if the disk unit 25 was detected at the step 214. If detected, the flow advances to step 216, and if not, the flow terminates. At the step 216, the write-after process is set as the occupied process information 700, and a run state is set as the execution information 701.

At step 217, the physical device information 70 for the detected disk unit is set. Specifically, the number of the subject cylinder is set as the cylinder number 703, "1" is set as the entry number, the number of the subject track is set as the track number, and a pointer to the start entry is set as the track pointer 705. The SCB occupied flag 400 of the occupied SCB 40 is turned on. At step 218, SCB 40 is searched which corresponds to the track 29 of the same cylinder of the same disk unit 25 and has the turned-off SCB occupied flag 400 and the turned-on write-after flag 407. At step 219, it is checked if SCB 40 corresponding to the track 29 has been detected. If detected, the flow advances to step 220, and if not, the flow advances to step 221. At the step 220, the track number 706 is set, the entry number 704 is incremented by "1", and the SCB occupied At step 221, a positioning request is issued to the disk unit 25, and a completion of this positioning is waited. At step 190, a write-after execution process is executed, the contents of which are shown in FIG. 19.

FIG. 19 is a flow chart of the write-after execution process corresponding to the step 190. At step 230, searching the record 30 starts, and the physical position of the positioned head of the disk unit 25 is stored. At step 231, the record 33 on the track 29 is traced, and its control field 34 is read. At step 232, it is checked whether the designated record number is the same as the record number read at the step 231. If they are coincident, the flow advances to step 234, and if not, the flow advances to step 233. At the step 233, it is checked if the disk rotated once by comparing the physical position stored at the step 230 with the physical position of the record read at the step 231. If the disk has not rotated once, the flow returns to the step 231, and if the disk rotated once, the flow advances to step 239. At the step 234, the record 33 is read from the cache slot 241 and written in the disk unit 25. A null value is set to the updated record pointer 409 for the written record 33. When all updated record pointers for the track 29 are set with null values, the write-after flag 407 and sequential write flag 409 are turned off. At step 235, it is checked whether the records 33 on the track have been processed.

If the process has not been completed, the flow returns to the step 230, and if completed, the flow advances to step 236. At the step 236, the occupied slot number 460 and the current slot number 466 are decremented by "1", and the SCB occupied flag 400 is turned off. At step 237, it is checked if the write-after process has been completed. If not completed, the flow advances to step 242, and if completed, the flow advances to step 239. At the step 242, it is checked whether the occupied process information 700 is the sequential write-after process and it is checked from the entry number 704 and the track pointer 705 whether the number of unprocessed tracks is "1". If the conditions are satisfied, the flow advances to step 239, and if not, the flow advances to step 238. At the step 238, the next track undergoes the write-after execution process, Namely, the track pointer 457 is updated to point the next entry. After the step 238, the flow returns to the step 230. At the step 239, the SCB occupied flag 400 of the occupied SCB 40 is turned off to release SCB 40, and the contents of the physical device information 70 are invalidated. Specifically, a null value is set to the occupied process information 700 of the physical device information 70, and an idle state is set as the execution information 701. At step 240, it is judged from the execution information 601 of the logical device information 60 whether the process for the logical device is in a wait state. If in a wait state, the flow advances to step 241, and if not the process is terminated. At the step 241, a ready state is set as the execution information 601 of the logical device information 60.

According to the above-described embodiment of the present invention, the cache workload judgment process 1 sets an allocation limit for each disk unit 25 when the amount of write-after data becomes the threshold value or more. If CPU 20 issues a data write request which requires write-after data more than the allocation limit, this request is held in a wait state until write-after data within the cache memory 24 becomes less than the allocation limit after the write-after process 5 writes write-after data within the cache memory 24 into a disk unit 25. Therefore, the allocation amount to the disk unit becomes neither too large nor too small. In this manner, proper allocation of the cache memory 24 to each disk unit 25 can be realized.

Furthermore, if the amount of write-after data increases rapidly upon request of a sequential access from CPU 20, the write-after data is written from the cache memory to a storage unit. Therefore, proper allocation of the cache memory 24 to each storage unit can be realized.

Next, the second embodiment of the present invention will be described. The configuration of the information processing system is the same as the first embodiment, except that the CPU set-up process to be executed by the director differs from the first embodiment. Only the different points from the first embodiment will be described below.

In this embodiment, a CPU set-up process 1000 performs a CPU disk-transfer process 1019 if there is write-after data more than the allocation limit of the cache memory.

Figure 20:
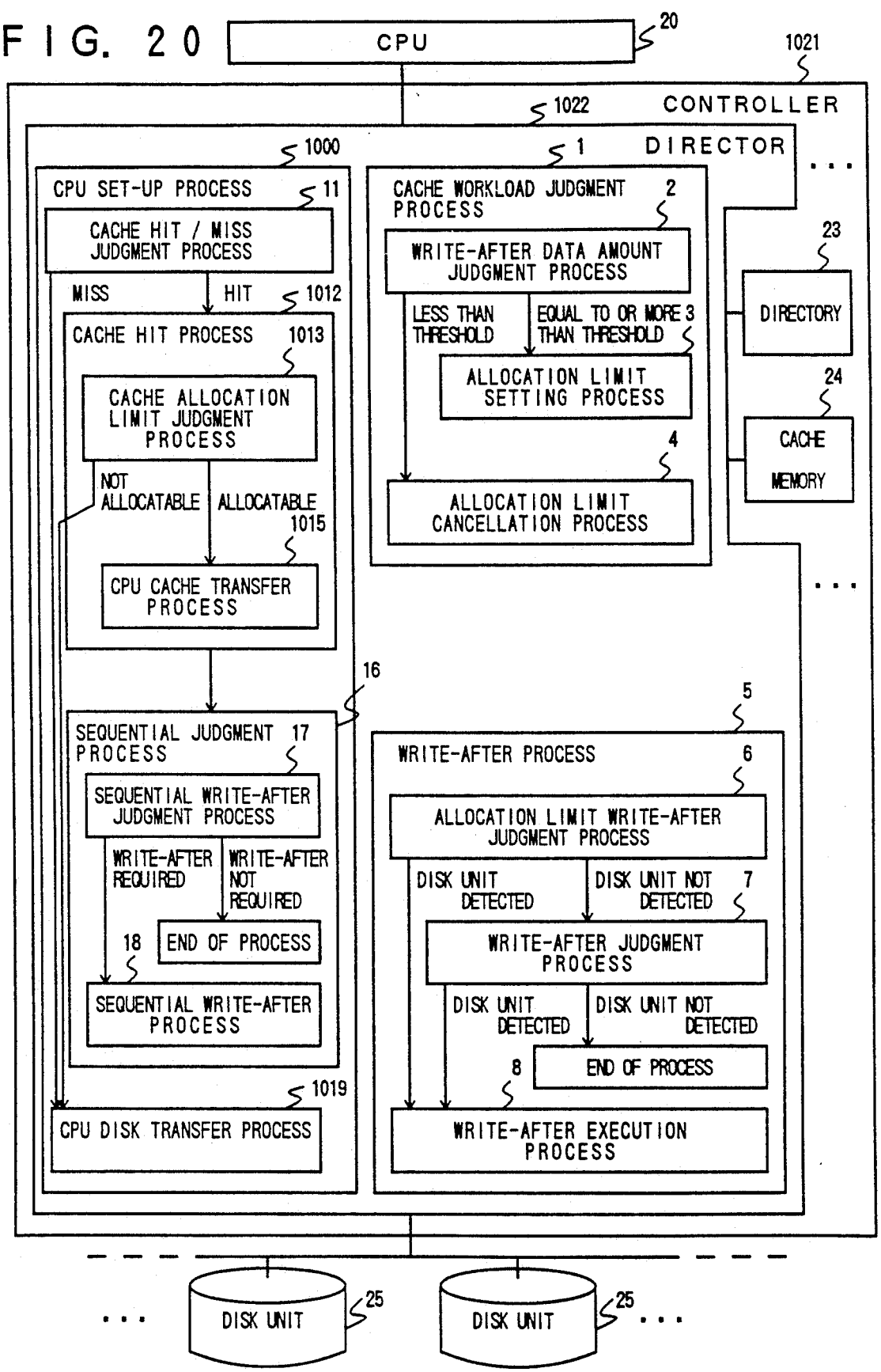
FIG. 20 shows the configuration of an information processing system according to a second embodiment of the present invention.

FIG. 20 shows the information processing system according to the second embodiment of the present invention. A director 1022 transfers data between CPU 20 and a disk unit 25, between CPU 20 and the cache memory 24, and between the cache memory 24 and a disk unit 25. The CPU set-up process 1000 transfers data between CPU 20 and a disk unit 25 and between CPU 20 and the cache memory 24, in response to an instruction from CPU 20. In data transfer between CPU 20 and the cache memory 24, updated data in the cache memory 24 is called write-after data, and a process of writing write-after data within the cache memory 24 into a disk unit 25 is called a write-after process. The hit/miss judgment process 11 judges whether the contents of the track 29 to be processed exist in the cache memory 24.

In the case of a cache hit, a cache hit process 1012 is executed. In the cache hit process 1012, a cache allocation limit judgment process 1013 checks an allocation of the cache memory 24 for write-after data, and if not allocatable, the CPU disk transfer process 1019 is executed. A CPU-cache transfer process 1015 transfers data between CPU 20 and the cache memory 24. The sequential judgment process 16, cache workload judgment process 1, and write-after process 5 are the same as the first embodiment, so the description thereof is omitted.

Figure 21:
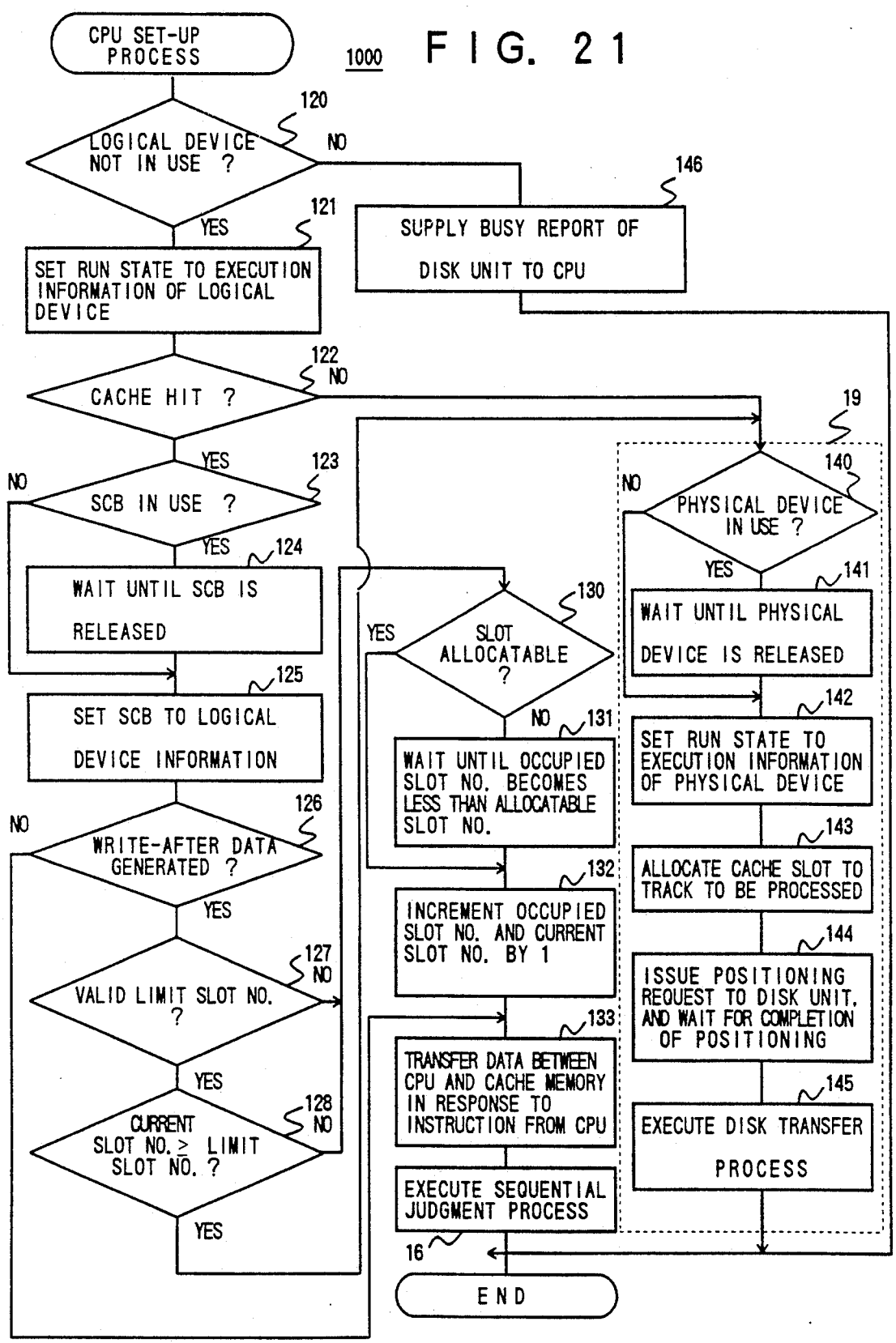
FIG. 21 is a flow chart of a CPU set-up process according to the second embodiment.

FIG. 21 is a flow chart of the CPU set-up process according to the second embodiment. The CPU set-up process 1000 transfers data between CPU 20 and a disk unit 25 and between CPU 20 and the cache memory 24, in response to an instruction from CPU 20 to the controller 21. Steps 120 to 127 are the same as the first embodiment, so the description thereof is omitted. At step 128, it is judged whether the current slot number is equal to or larger than the limit slot number. If the condition is satisfied, the flow advances to step 140, and if not, the flow advances to step 130. Steps 130 to 133, steps 140 to 145, and step 16 are the same as the first embodiment, so the description thereof is omitted.

According to the second embodiment of the present invention, the cache workload judgment process 1 sets an allocation limit for each disk unit 25 when the amount of write-after data becomes the threshold value or more. If CPU 20 issues a data write request which requires write-after data more than the allocation limit, the CPU disk transfer process 19 transfers data between CPU 20 and a disk unit 25. Therefore, the allocation amount to the disk unit becomes neither too large nor too small. In this manner, proper allocation of the cache memory 24 to each disk unit 25 can be realized.

Next, the third embodiment of the present invention will be described. The third embodiment differs from the first embodiment in that the allocatable slot number 460, overload setting slot number 461, overload cancellation slot number 463, and minimum allocation slot number 476, respectively of the overload management information 46 are externally set. In this embodiment, a service panel 36 is connected to the controller 21 so that the overload management information 46 can be set using the service panel. Only the different points from the first embodiment will be described below.

Figure 22:
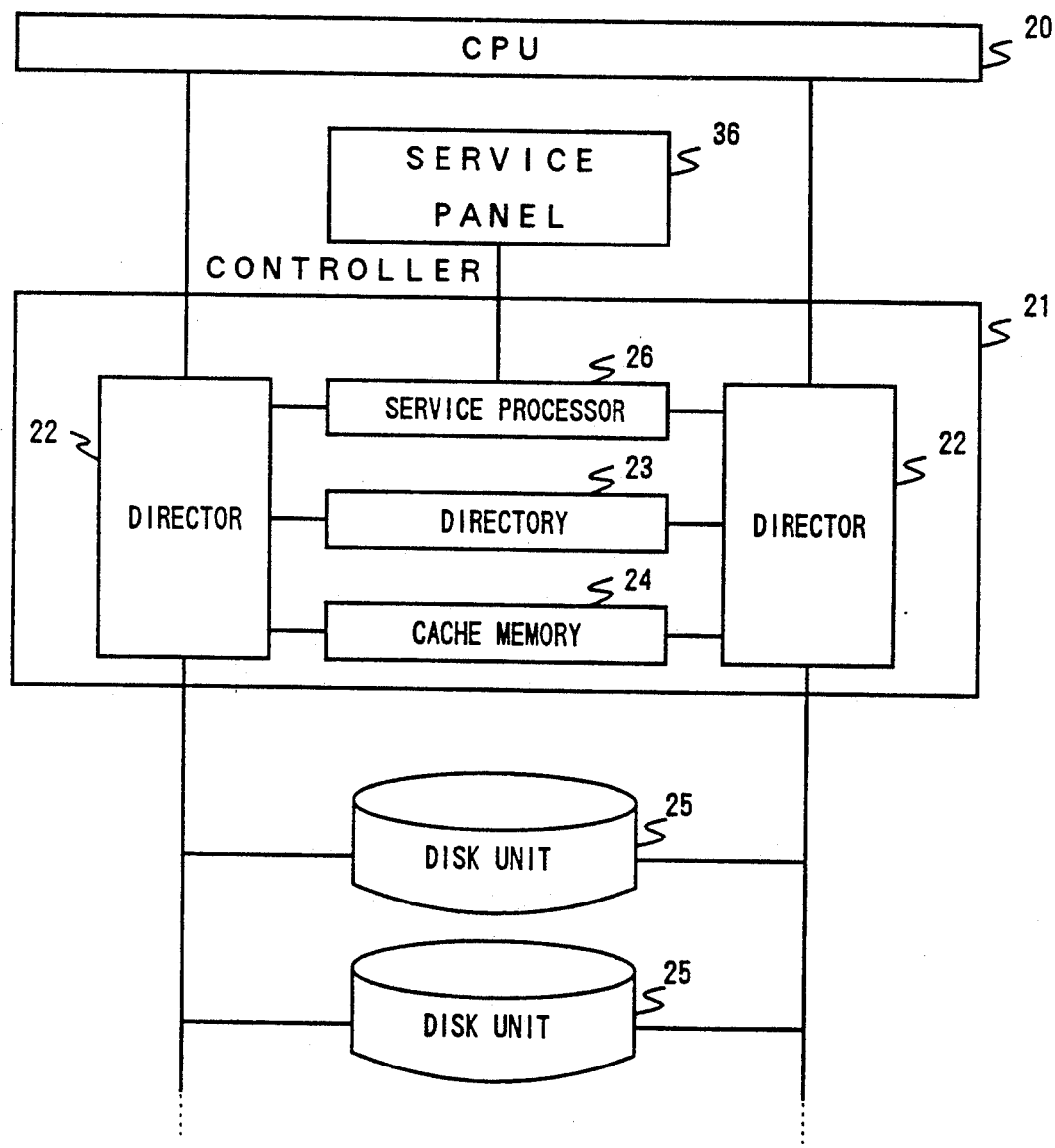
FIG. 22 is a schematic diagram briefly showing an information processing system according to a third embodiment of the present invention.

FIG. 22 is a schematic diagram showing the outline of the information processing system according to the third embodiment of the present invention. The information processing system includes a central processing unit (CPU) 20, the controller 21 connected to CPU 20, the service panel 36 connected to the controller 21, and at least one disk unit 25 connected to the controller 21. The controller 21 has a directory 23, cache memory 24, service processor 26, and at least one director 22.

Figure 23:
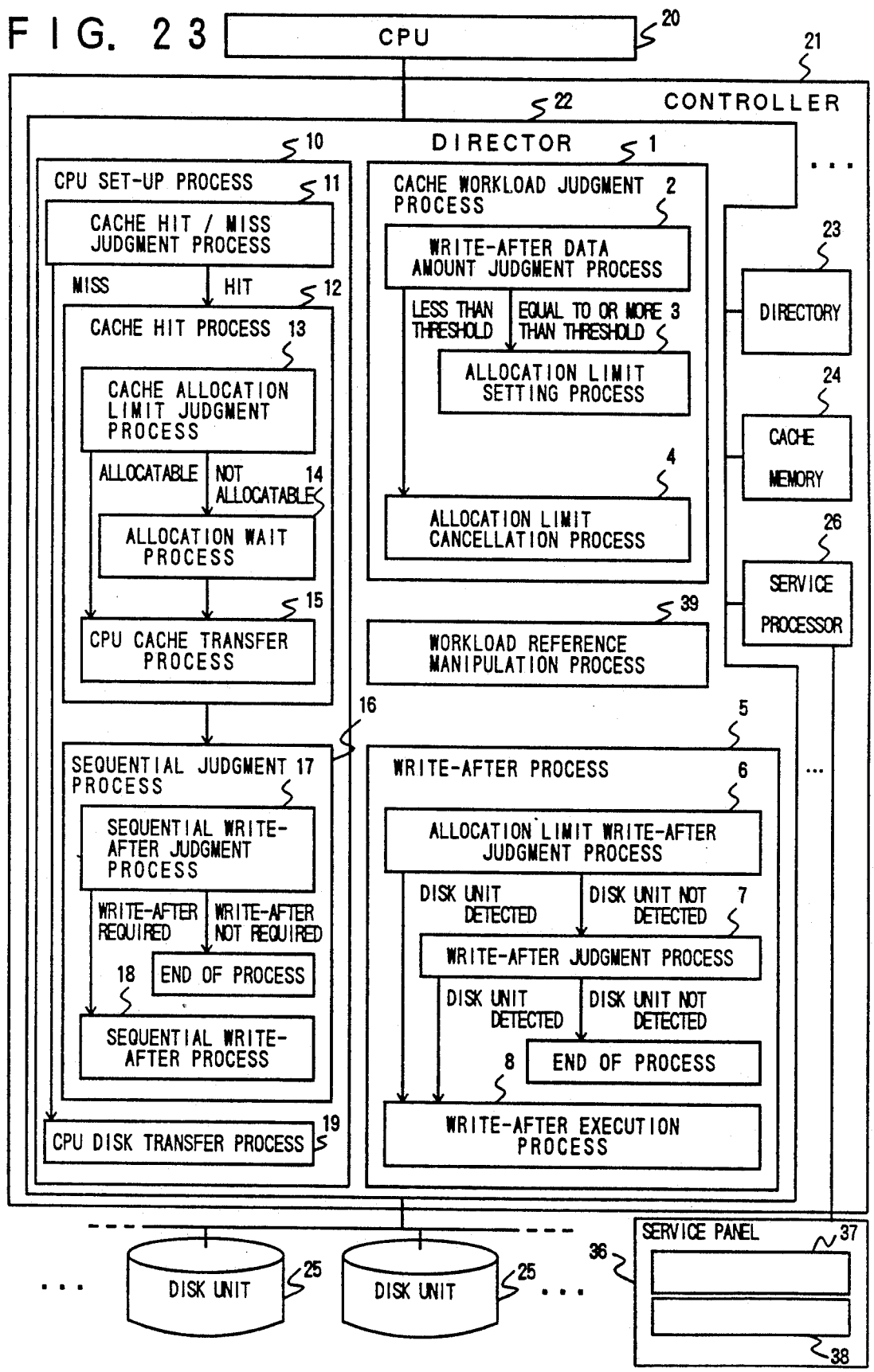
FIG. 23 shows the configuration of the information processing system according to the third embodiment.

FIG. 23 shows the configuration of the information processing system according to the third embodiment of the present invention. The director 22 transfers data between CPU 20 and a disk unit 25, between CPU 20 and the cache memory 24, and between cache memory 24 and a disk unit 25. The CPU set-up process 10, cache workload judgment process 1, and write-after process 5 are the same as the first embodiment, so the description thereof is omitted. A workload reference manipulation process 39 reads or updates the contents of the directory 23 in response to an instruction from the service processor 26. The service panel 36 includes a display unit 37 for displaying and supplying control information of the controller 21 to a user, and an instruction reception unit 38 for receiving an instruction from the user. The service processor 26 is provided between the service panel 37 and the director 22, for display and transfer of data.

FIG. 24 shows the contents to be displayed on the service panel 36. The display contents include an allocatable slot number 81, an overload setting slot number 82, an overload cancellation slot number 83, a disk unit number 84, a limit slot number 85, and a minimum allocation slot number 86. The allocatable slot number 81, overload setting slot number 82, overload cancellation slot number 83, limit slot number 85, and minimum allocation slot number 86 correspond to the allocatable slot number 450, overload setting slot number 462, overload cancellation slot number 463, limit slot number 472, and minimum allocation slot number 476, respectively. If the contents of each information are a null value, a blank is displayed, whereas if the contents are not a null value, its numerical data is displayed. The disk unit number 84 is the number of a disk unit, this data field not being updated. A message display field 87 is used for displaying an error indication or the like when the contents of information supplied from a user have an error.

Figure 25:
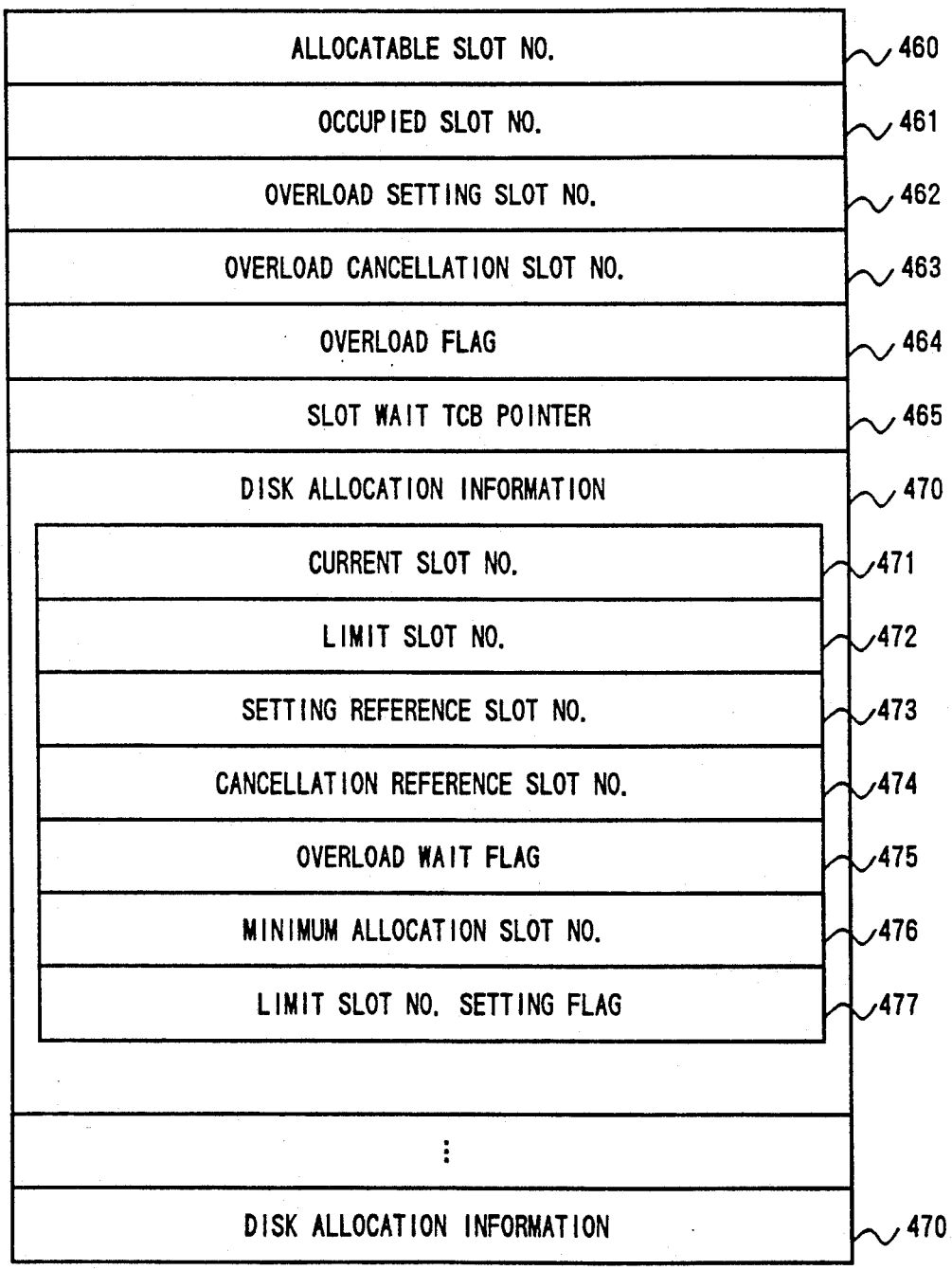
FIG. 25 shows the contents of load management information according to the third embodiment.

FIG. 25 shows the contents of the workload management information according to the third embodiment. The workload management information 46 is information used for management of an occupied state of write-after data in the cache memory 24. The different point from the first embodiment shown in FIG. 10 is that a limit slot number setting flag 477 is newly provided within the disk allocation information 470. This flag 477 will be described below. The limit slot number setting flag 477 indicates whether the limit slot number 472 is a number set in response to an external instruction.

Figure 26:
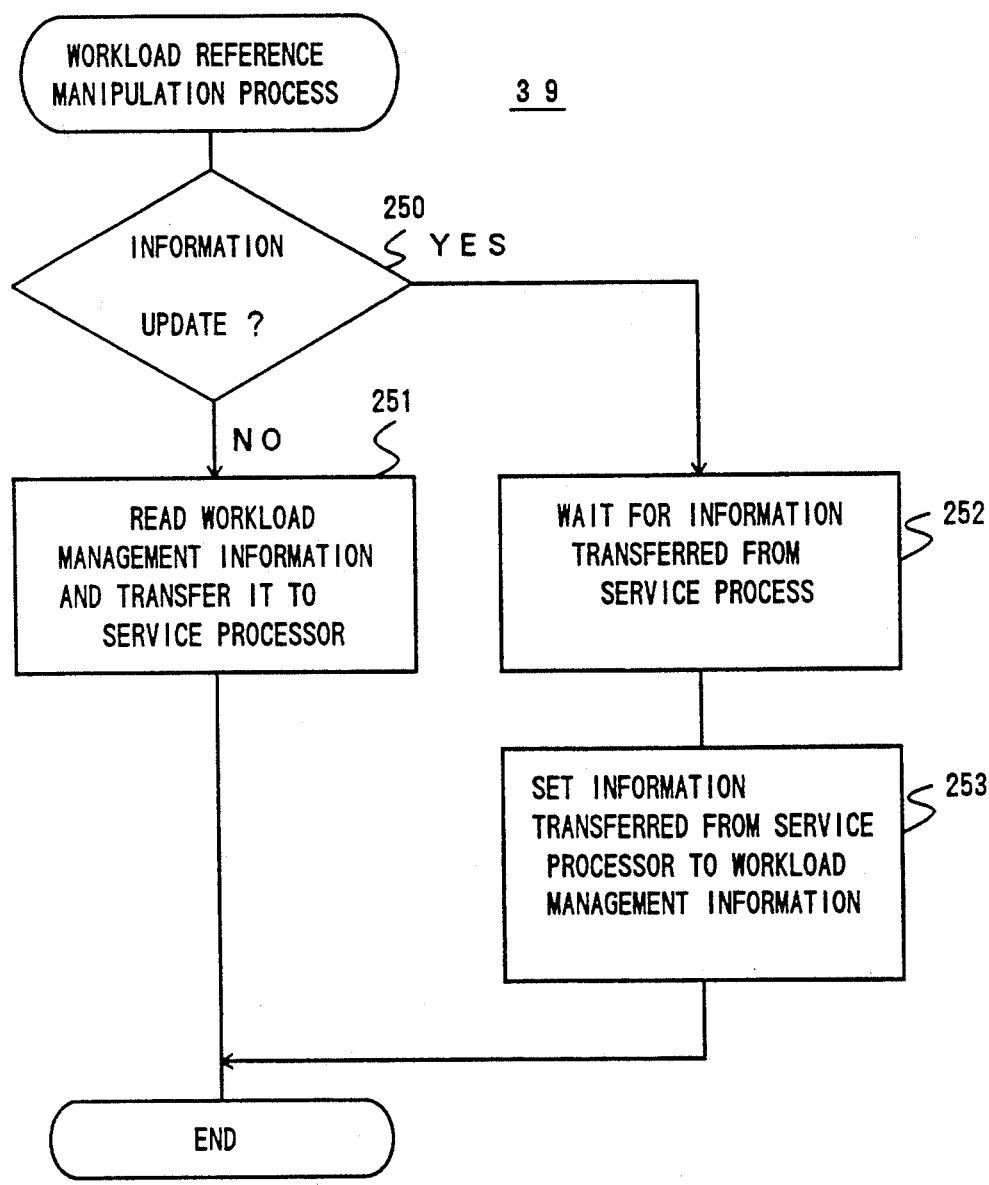
FIG. 26 is a flow chart of workload reference manipulation process by a service processor.

FIG. 26 is a flow chart of the workload reference manipulation process to be executed by the service processor. The director 22 executes the workload reference manipulation process 39 in response to an instruction from the service processor 26. At step 250, it is judged whether an instruction from the service processor 26 is information update. If information update, the flow advances to step 252, and if not, the flow advances to step 251. At the step 251, the allocatable slot number, overload setting slot number, overload cancellation slot number, limit slot number, and minimum slot number are read and transferred to the service processor 26. Step 252 waits for the information to be transferred from the service processor 26. At step 253, the information transferred from the service processor 26 are set as the allocatable slot number, overload setting slot number, overload cancellation slot number, limit slot number, and minimum slot number. At this time, the limit slot number setting flag 477 is turned on for the disk unit 25 whose limit slot number is other than a null value.

Figure 27:
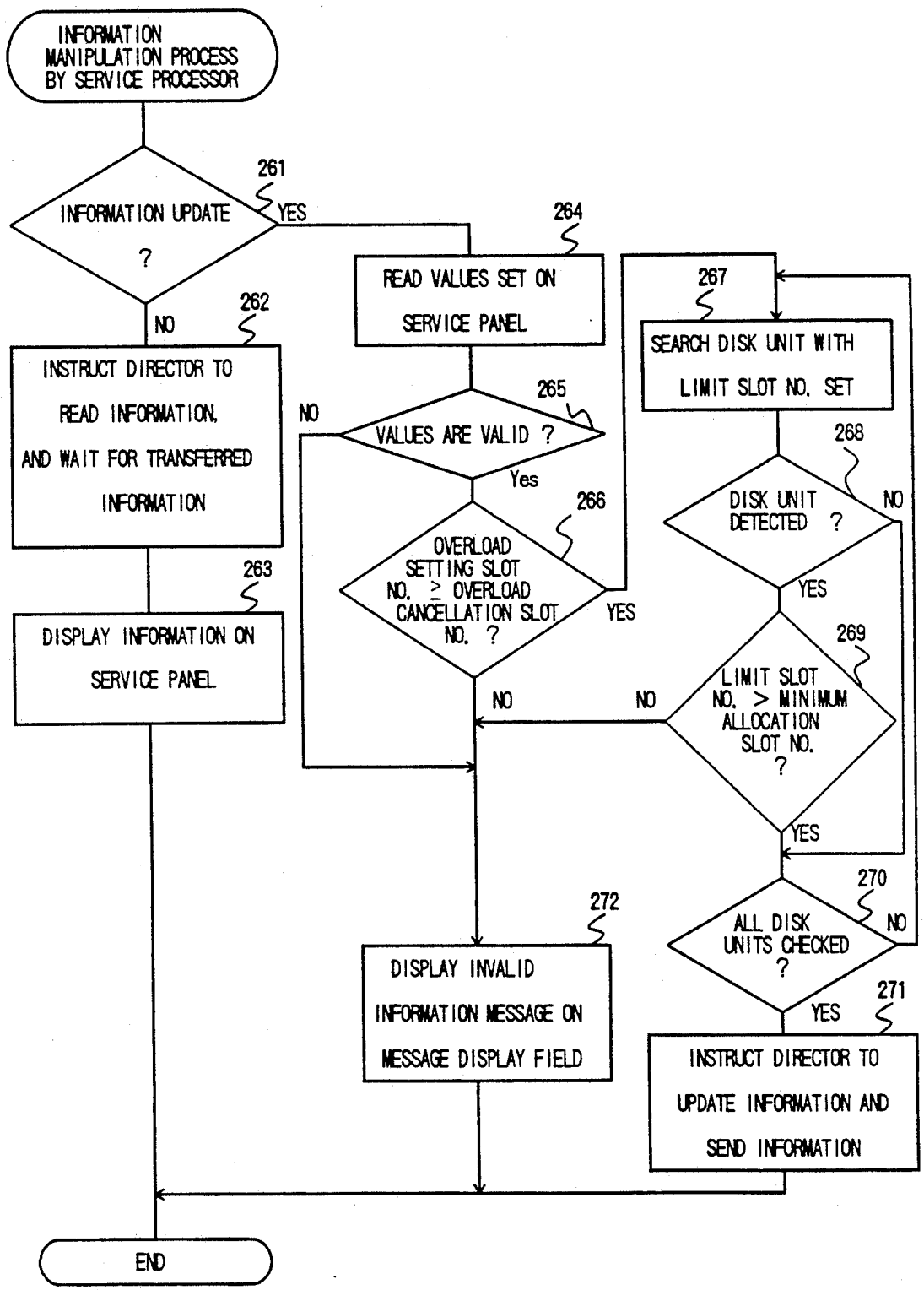
FIG. 27 is a flow chart of the information manipulation process to be executed by the service processor.

FIG. 27 is a flow chart showing the information manipulation process to be executed by the service processor. This process is executed by the service processor 26 upon reception of an instruction at the instruction reception unit 38 of the service panel 36. At step 261, it is judged whether an instruction from a user is information update. If information update, the flow advances to step 264, and if not, the flow advances to step 262. At the step 262, the director 22 is instructed to read information, and the information to be transferred is waited. At step 263, the information is displayed on the service panel 36. The display contents have been described above with reference to FIG. 24.

At the step 264, values set on the service panel 36 are read. At step 265, it is judged whether the set contents are valid. Namely, it is judged whether there is a "0" value except the minimum slot number and whether there is information having a set number larger than the actual number of slots. The actual number of slots is the number of all slots 241 within the cache memory 24. If the condition is satisfied, the flow advances to step 266, and if not, the flow advances to step 272. At the step 266, it is judged whether the overload setting slot number is equal to or larger than the overload cancellation slot number. If the condition is satisfied, the flow advances to step 267, and if not, the flow advances to the step 272.

At the step 267, a disk unit is searched which set the limit slot number or the minimum allocation slot number. At step 268, it is judged if the disk unit was searched. If searched, the flow advances to step 269, and if not, the flow advances to step 270. At the step 269, it is judged whether the limit slot number is larger than the minimum allocation slot number. If the condition is satisfied, the flow advances to step 270, and if not, the flow advances to the step 272. At the step 270, it is judged whether checking all disk units 25 has been completed. If completed, the flow advances to step 271, and if not, the flow returns back to the step 267. At the step 271, the updated information is transferred to the director 22 to update it. At the step 272, an error indication representing invalid information is displayed on the message display field 87 shown in FIG. 24.

Figure 28:
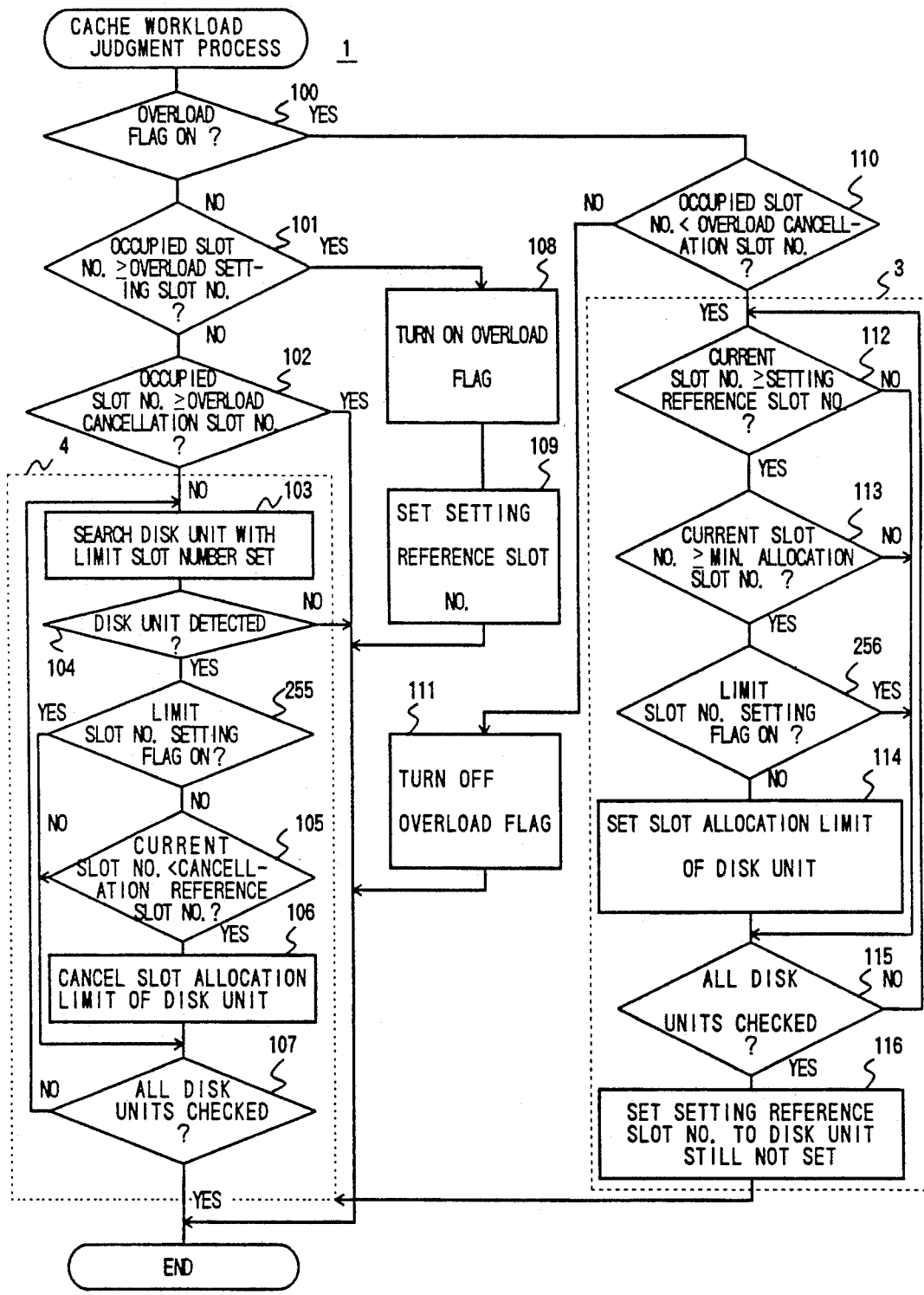
FIG. 28 is a flow chart of the cache workload judgment process the third embodiment.

FIG. 28 is a flow chart of the cache workload judgment process 1 according to the third embodiment. This process 1 judges the workload state of the cache memory 24 from the amount of write-after data occupying the cache memory 24. The different points from the first embodiment shown in FIG. 11 are that step 255 is inserted between steps 104 and 105, and step 256 is inserted between steps 113 and 114.

At step 100, it is judged whether the overload flag 464 is on. If on, the flow advances to step 110, and if off, the flow advances to step 101. At the step 101, it is judged whether the occupied slot number is equal to or larger than the overload setting slot number. If the condition is satisfied, the flow advances to step 108, and if not, the flow advances to step 102. At the step 102, it is judged whether the occupied slot number is equal to or larger than the overload cancellation slot number. If the condition is satisfied, the process is terminated, and if not, the flow advances to step 103.

Steps 103 to 107 and step 255 correspond to the allocation limit cancellation process 4 shown in FIG. 23. Slot allocation limit to the disk unit 25 is canceled. At the step 103, a disk unit 25 whose limit number having been set is searched. At step 104, it is checked whether the disk unit 25 was detected. If detected, the flow advances to the step 255, and if not, the process is terminated. At the step 255, it is judged whether the limit slot number setting flag 477 is on. If on, the slow advances to step 107, and if off, the flow advances to step 105. At the step 105, it is judged whether the current slot number is smaller than the setting cancellation reference slot number. If the condition is satisfied, the flow advances to step 106, and if not, the flow advances to step 107. At the step 106, in order to cancel the limit value, a null value is set to the limit slot number, setting reference slot number and setting cancellation slot number. At step 107, it is judged whether checking all disk units 25 has been completed. If not completed, the flow returns back to the step 103, and if completed, the process is terminated.

Steps 108 and 109 set a predetermined value as an overload state of the cache memory 24. Specifically, at the step 108, the overload flag 464 is turned on. At the step 109, the current slot number is set as the setting reference slot number for each disk unit 25.

At step 110, it is judged whether the occupied slot number is smaller than the overload cancellation slot number. If the condition is satisfied, the flow advances to step 111, and if not, the flow advances to step 112. At the step 111, the overload flag 464 is turned off to thereafter terminate the process.

Steps 112 to 115 and step 256 correspond to the allocation limit setting process 3 shown in FIG. 23. This process sets an allocation limit of the cache slots 241 to the disk units 25. At step 112, it is judged whether the current slot number is equal to or larger than the setting reference slot number. If the condition is satisfied, the flow advances to step 113, and if not, the flow advances to step 115. At the step 113, it is judged whether the current slot number is equal to or larger than the minimum allocation slot number. If the condition is satisfied, the flow advances to step 256, and if not, the flow advances to step 115. At the step 256, it is judged whether the limit slot number setting flag 477 is on. If on, the flow advances to step 115, and if off, the flow advances to step 114. At the step 114, the limit slot number and cancellation reference slot number of the disk unit 25 are set. Specifically, the current slot number is set as the limit slot number of the overload management information 46, and the setting reference number is set as the cancellation reference slot number of the overload management information 46. As the cancellation reference slot number, a predetermined fraction of the current slot number may be set. At the step 115, it is judged whether checking all disk units 25 has been completed If not completed, the flow returns back to the step 112, and if completed, the flow advances to step 116. At the step 116, for the disk unit 25 whose setting reference slot number has not been set, the current slot number is set as the setting reference slot number of the overload management information 46.

In the above embodiment, setting the allocatable slot number, overload setting slot number, overload cancellation slot number and minimum allocation slot number, respectively of the overload management information 46 has been executed in response to an instruction from the service panel 36. Such setting can be executed also in response to an instruction from CPU 20. Setting the overload management information 46 in response to an instruction from CPU 20 will be described below.

FIGS. 29A and 29B show the contents of information to be transferred between CPU 20 and the controller 21. Requests issued by CPU 20 include a workload information sense request for requesting to read workload information, and a workload information setting request for requesting to set workload information. A workload information sense command 90 shown in FIG. 29A is the workload information sense request from CPU 20. Upon reception of the workload information sense command from CPU 20, the controller 21 transfers an allocatable slot number 91, an overload setting slot number 92, an overload cancellation slot number 93, a disk unit number 94, a limit slot number 95, and a minimum allocation slot number, respectively to CPU 20. The allocatable slot number 91, overload setting slot number 92, overload cancellation slot number 93, disk unit number 94, limit slot number 95, and minimum allocation slot number 96, correspond to the allocatable slot number 460, overload setting slot number 462, overload cancellation slot number 463, limit slot number 472, and minimum allocation slot number 476, respectively. The disk unit number 94 is the number of a disk unit 25.

A workload information setting command 97 shown in FIG. 29B is the workload information setting request from CPU 20. Upon reception of the workload information setting command 97 from CPU 20, the controller 21 sets the allocatable slot number 91, overload setting slot number 92, overload cancellation slot number 93, disk unit number 94, limit slot number 95, and minimum allocation slot number 96, respectively transferred from CPU 20, as the corresponding allocatable slot number 460, overload setting slot number 462, overload cancellation slot number 463, limit slot number 472, and minimum allocation slot number 476.

Figure 30:
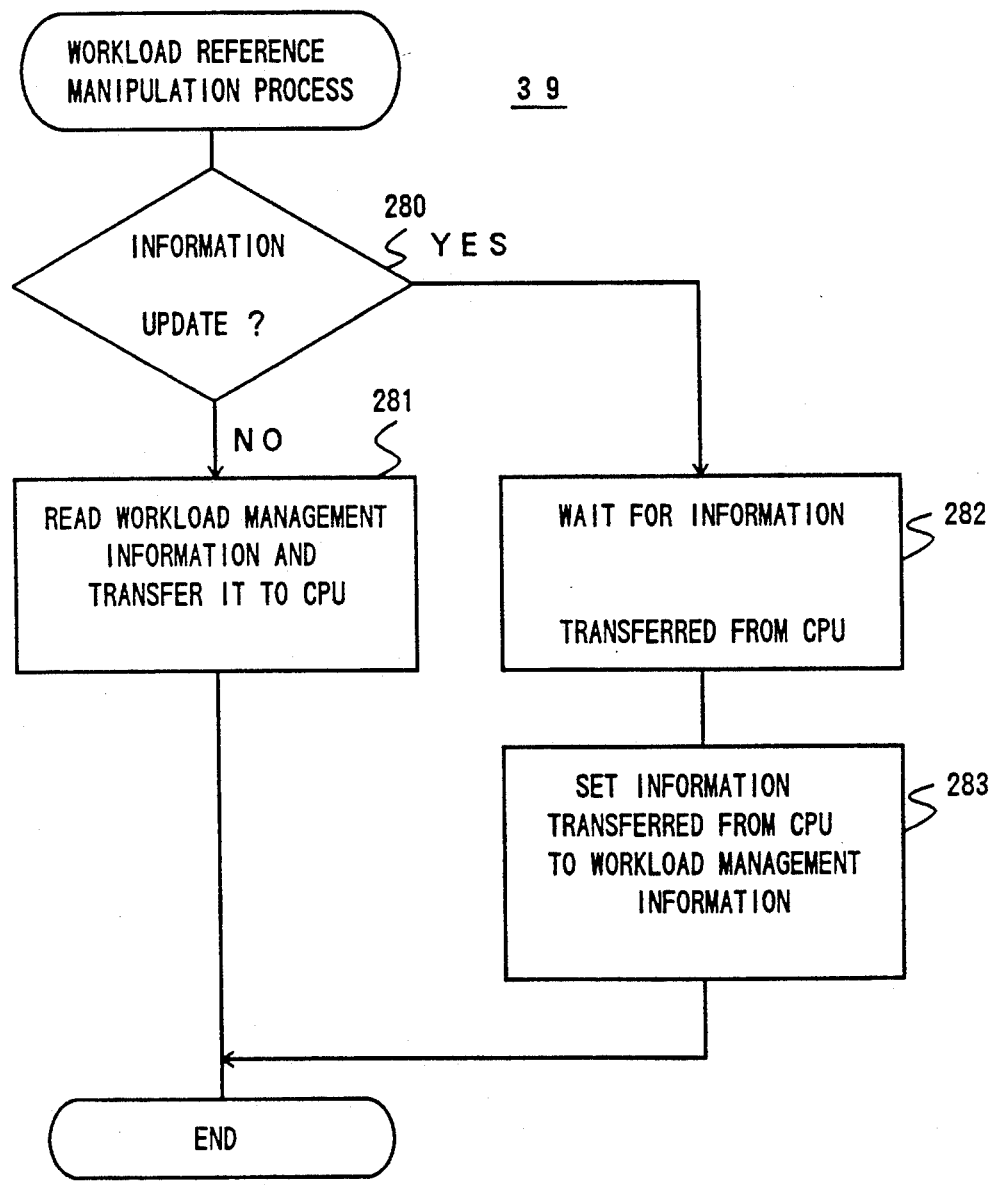
FIG. 30 is a flow chart of the workload reference manipulation process.

FIG. 30 is the flow chart of the workload reference manipulation process shown in FIG. 23. This process is executed by the director 22 upon reception of the workload information sense command 90 or the workload information setting command 97 from CPU 20. At step 280, it is judged whether a command from CPU 20 is the workload information setting command 97. If it is the command 97, the flow advances to step 282, and if not, the flow advances to step 281. At the step 281, the allocatable slot number 460, overload setting slot number 462, overload cancellation slot number 463, limit slot number 472, and minimum allocation slot number 476, are read from the directory 23, and transferred to CPU 20 as the allocatable slot number 91, overload setting slot number 92, overload cancellation slot number 93, disk unit number 94, limit slot number 95, and minimum allocation slot number 96, respectively.

Step 282 waits for the allocatable slot number 91, overload setting slot number 92, overload cancellation slot number 93, disk unit number 94, limit slot number 95, and minimum allocation slot number 96, respectively to be transferred from CPU 20. At step 283, the allocatable slot number 91, overload setting slot number 92, overload cancellation slot number 93, disk unit number 94, limit slot number 95, and minimum allocation slot number 96, are set as the allocatable slot number 460, overload setting slot number 462, overload cancellation slot number 463, limit slot number 472, and minimum allocation slot number 476, respectively of the overload management information 46. At this time, the limit slot number setting flag 477 is turned on for the disk unit 25 whose limit slot number 95 is not a null value.

According to the above-described embodiment, allocation limits of write-after data are set upon reception of an instruction from a user or CPU 20. If allocation limits of write-after data are not set by a user or CPU 20, the cache workload judgment process 1 sets an allocation limit for each disk unit 25 when the amount of write-after data becomes the threshold value or more. If CPU 20 issues a data write request which requires write-after data more than the allocation limit, this request is held in a wait state until write-after data within the cache memory 24 becomes less than the allocation limit after the write-after process 5 writes write-after data within the cache memory 24 into a disk unit 25. Therefore, the allocation amount to the disk unit becomes neither too large nor too small. In this manner, proper allocation of the cache memory 24 to each disk unit 25 can be realized.

We claim:

1. A controller for controlling a plurality of storage units in an information processing system having a central processing unit, the plurality of storage units, comprising:

a cache memory connected between said central processing unit and the plurality of storage units, for storing part of data stored in the plurality of storage units, said part of data including data to be written back to at least one storage unit in order to keep consistency of data between said cache memory and the storage units, and for executing data transfer to/from said central processing unit and the plurality of storage units;

a directory for storing management information of the plurality of storage units and said cache memory; and a director for controlling the operation of said cache memory, managing said directory, and controlling data transfer between said cache memory and the plurality of storage units, wherein said director includes:

means for judging whether the amount of data within said cache memory before being written in the plurality of storage units is equal to or more than a first threshold value or less than a second threshold value;

means for setting an allocation limit data amount of said cache memory to each of the plurality of storage units, if said judging means judges that said amount of data is equal to or more than said first threshold value;

means for canceling said allocation limit data amount of said cache memory set to each of the plurality of storage units, if said judging means judges that said amount of data is less than said second threshold value;

means responsive to a request from said central processing unit requiring an allocation of said cache memory equal to or more than said allocation limit data amount, for holding in a wait state said request for writing data from said central processing unit to said cache memory; and means for writing data within said cache memory still not written in the plurality of storage units, into one of the plurality of storage units.

2. A controller according to claim 1, wherein said director includes:

means for informing said central processing unit of said threshold values and said allocation limit data amount; and means responsive to an instruction from said central processing unit for setting said threshold values and said allocation limit data amount.

3. A controller according to claim 1, wherein said means for writing said still-not written data into the storage unit preferentially writes still-not written data in said cache memory into the storage unit among the plurality of storage units to which data under said wait state from said central processing unit is to be written.

4. A controller according to claim 1, wherein said director includes:

sequential data judgment means for judging whether there is a predetermined amount or more of still-not sequential data generated upon a sequential access instruction from said central processing unit; and means for writing said sequential data from said cache memory to a corresponding one of the plurality of storage units, if said sequential data judgment means said sequential data.

5. A controller according to claim 1, wherein said means for setting said allocation limit data amount sets, as said allocation limit data amount, the amount of data in said cache memory for each storage unit, when the amount of data for the storage unit increased after said judging means judges that the amount of data is equal to or more than said first threshold value.

6. A controller according to claim 1, wherein said means for canceling said allocation limit data amount cancels said allocation limit data amount for each storage unit, when the amount of data for the storage unit reduced form said allocation limit data amount by a predetermined ratio after the still-not written data amount within said cache memory becomes less than said second threshold value.

7. A controller for controlling a plurality of storage units in an information processing system having a central processing unit, the plurality of storage units, and service panel means for providing displayed information to a user and for receiving an instruction from the user, comprising:

a cache memory connected between said central processing unit and the plurality of storage units, for storing part of data stored in the plurality of storage units, said part of data including data to be written back to at least one storage unit in order to keep consistency of data between said cache memory and the storage units, and for executing data transfer to/from said central processing unit and the plurality of storage units;

a directory for storing management information of the plurality of storage units and said cache memory;

a director for controlling the operation of said cache memory, managing said directory, and controlling data transfer between said cache memory and the plurality of storage units; and a service processor connected between said director and said service panel means, wherein said director includes means for judging whether the amount of data within said cache memory before being written in the plurality of storage units is equal to or more than a first threshold value or less than a second threshold value;

means for setting an allocation limit data amount of said cache memory to each of the plurality of storage units, if said judging means judges that said amount of data is equal to or more than said first threshold value;

means for canceling said allocation limit data amount of said cache memory set to each of the plurality of storage units, if said judging means judges that said amount of data is less than said second threshold value;

means responsive to a request from said central processing unit requiring an allocation of said cache memory equal to or more than said allocation limit data amount, for holding in a wait state said request for writing data from said central processing unit to said cache memory; and means for writing data within said cache memory still not written in the plurality of storage units, into one of the plurality of storage units, and wherein said service processor is adapted to change said threshold values and said allocation limit data amount by using said service panel means.

8. A controller for controlling a plurality of storage units in an information processing system having a central processing unit and the plurality of storage units, comprising:

a cache memory connected between said central processing unit and the plurality of storage units, for storing part of data stored in the plurality of storage units, said part of data including data to be written back to at least one storage unit in order to keep consistency between said cache memory and the storage units, and for executing data transfer to/from said central processing unit and the plurality of storage units;

a directory for storing management information of the plurality of storage units and said cache memory; and said cache memory, managing said directory, and controlling data transfer between said cache memory and the plurality of storage units, wherein said director includes:

means for judging whether the amount of data within said cache memory before being written in the plurality of storage units is equal to or more than a first threshold value or less than a second threshold value;

means for setting an allocation limit data amount of said cache memory to each of the plurality of storage units, if said judging means judges that said amount of data is equal to or more than said first threshold value;

means for canceling said allocation limit data amount of said cache memory set to each of the plurality of storage units, if said judging means judges that said amount of data is less than said second threshold value;

means responsive to a request from said central processing unit requiring an allocation of said cache memory equal to or more than said allocation limit data amount, for executing said request for writing data directly from said central processing unit to the storage unit; and means for writing data within said cache memory still not written in the plurality of storage units, into one of the plurality of storage units.

9. A controller according to claim 8, wherein said means for writing said still-not written data into the storage unit preferentially writes still-not written data in said cache memory into the storage unit among the plurality of storage units to which data under said wait state from said central processing unit is to be written.

10. A method of controlling a plurality of storage units by a controller in an information processing system having a central processing unit, the plurality of storage units, a cache memory connected between the central processing unit and the plurality of storage units, and the controller connected to the central processing unit, the plurality of storage units ,and the cache memory, comprising the steps of:

judging whether the amount of data within said cache memory before being written in the plurality of storage units is equal to or more than a first threshold value or less than a second threshold value, when said central processing unit writes data in said cache memory;

setting an allocation limit data amount of said cache memory to each of the plurality of storage units, if said still-not written data is equal to or more than said first threshold value;

canceling said allocation limit data amount of said cache memory set to each of the plurality of storage units, if said still-not written data is less than said second threshold value;

responsive to a data write request from said central processing unit requiring an allocation of said cache memory equal to or more than said allocation limit data amount, holding in a wait state said data write request from said central processing unit; and writing said still-not written data within said cache memory into one of the plurality of storage units.

* * * * *